(12) United States Patent
Hirota et al.

(10) Patent No.: US 10,987,895 B2
(45) Date of Patent: Apr. 27, 2021

(54) ROOF MEMBER OR CEILING MEMBER, AND CONSTRUCTION

(71) Applicant: SUMITOMO CHEMICAL COMPANY, LIMITED, Tokyo (JP)

(72) Inventors: Tomoo Hirota, Chiba (JP); Hirokazu Matsui, Chiba (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 0 days.

(21) Appl. No.: 16/738,202

(22) Filed: Jan. 9, 2020

(65) Prior Publication Data
US 2020/0223174 A1 Jul. 16, 2020

(30) Foreign Application Priority Data

Jan. 11, 2019 (JP) .............................. JP2019-003258

(51) Int. Cl.
*B32B 5/18* (2006.01)
*B32B 27/06* (2006.01)

(52) U.S. Cl.
CPC .............. *B32B 5/18* (2013.01); *B32B 27/065* (2013.01); *B32B 2266/0228* (2013.01); *B32B 2307/304* (2013.01); *B32B 2307/7265* (2013.01); *B32B 2419/06* (2013.01)

(58) Field of Classification Search
CPC ...... B32B 2266/0228; B32B 2307/304; B32B 2307/7265; B32B 2419/06; B32B 27/065; B32B 5/18; C09K 5/063; E04B 1/80; E04D 13/16
See application file for complete search history.

(56) References Cited

U.S. PATENT DOCUMENTS

| 5,770,295 A | 6/1998 | Alderman |
| 5,875,835 A | 3/1999 | Shramo |
| 2018/0030175 A1 | 2/2018 | Miura et al. |

FOREIGN PATENT DOCUMENTS

| JP | S61-122354 A | 6/1986 |
| JP | H09-174741 A | 7/1997 |
| JP | 2000314187 A | 11/2000 |
| JP | 2015-020383 A | 2/2015 |
| WO | 2016098674 A | 6/2016 |
| WO | 2017/066832 A1 | 4/2017 |

OTHER PUBLICATIONS

AIJ Journal of technology and Design vol. 22, No. 52, 1027-1030. English Abstract included in text.
(Continued)

*Primary Examiner* — Lawrence D Ferguson
(74) *Attorney, Agent, or Firm* — Meunier Carlin & Curfman LLC

(57) ABSTRACT

Described herein is a roof member or a ceiling member, which is capable of reducing cooling and heating energy consumption by reducing influent and effluent heat amounts between indoor and outdoor environments in such a situation that the indoor temperature is kept constant by use of cooling and heating equipment independently of the outdoor air temperature changes. The disclosed member for roofing or ceiling includes an outdoor-side heat insulating layer (A); an indoor-side heat insulating layer (B); and a heat storage layer between the outdoor-side heat insulating layer (A) and the indoor-side heat insulating layer (B).

8 Claims, 5 Drawing Sheets

(56) References Cited

OTHER PUBLICATIONS

Jan Kosny et al: "Thermal load mitigation and passive cooling in residential attics containing PCM-enhanced Insulations", Solar Energy., vol. 108, Oct. 1, 2014, pp. 164-188.

Gianpiero Evola et al.: "The Effectiveness of PCM Wallboards for the Energy Refurbishment of Lightweight Buildings", Energy Procedia, vol. 62, 1 Jan. 2014, pp. 13-21.

Eva Guenther et al.: "Determination of the Heat Storage Capacity of PCM and PCM-Objects As a Function of Temperatur", Jan. 1, 2006.

Extended European search report dated Jun. 9, 2020, in European patent application No. 20150436.2.

Extended European search report dated Jun. 18, 2020, in European patent application No. 20150433.9.

[Fig. 1]
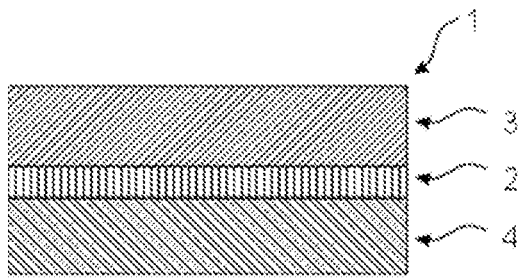
[Fig. 2]
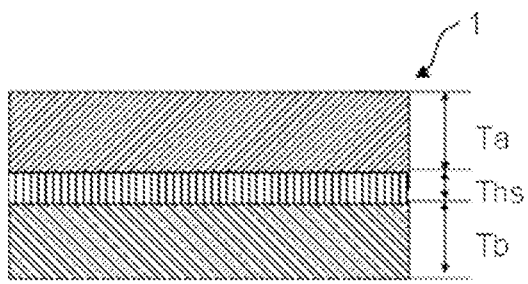
[Fig. 3]
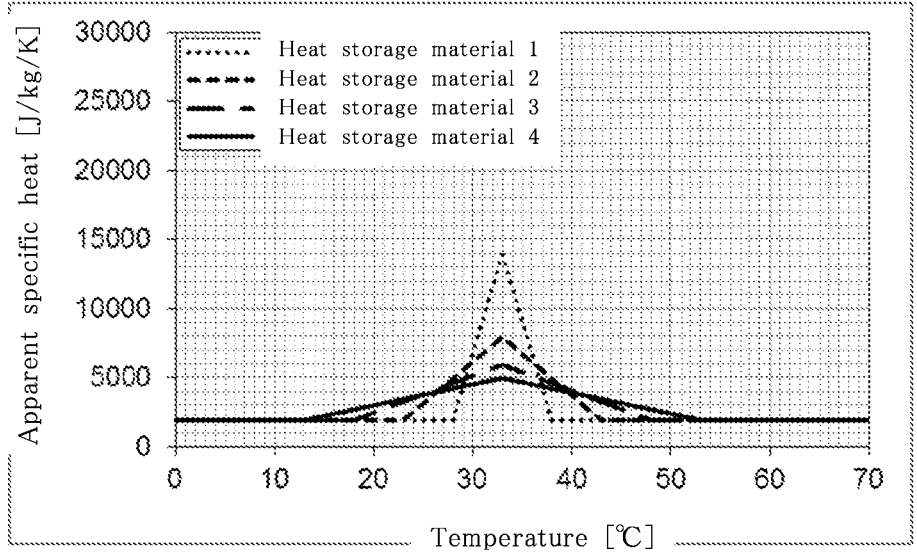

[Fig. 4]
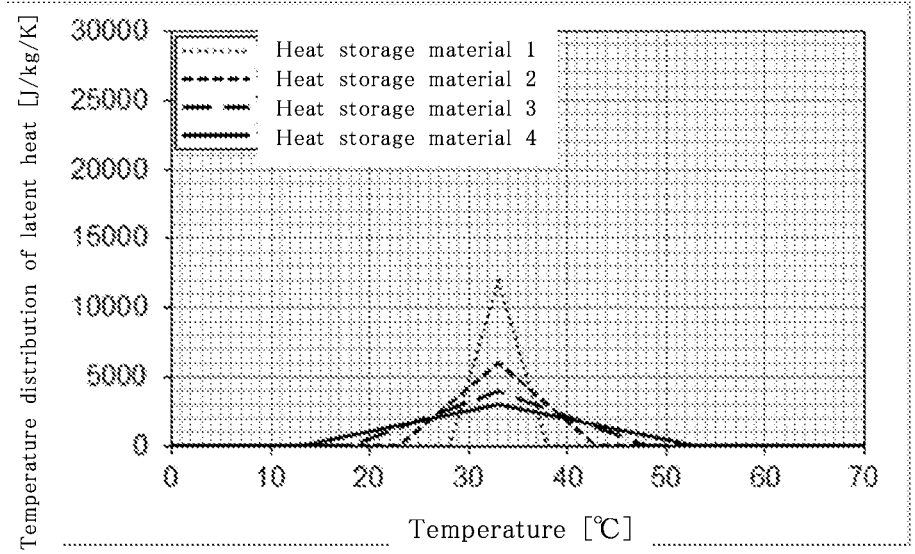
[Fig. 5]
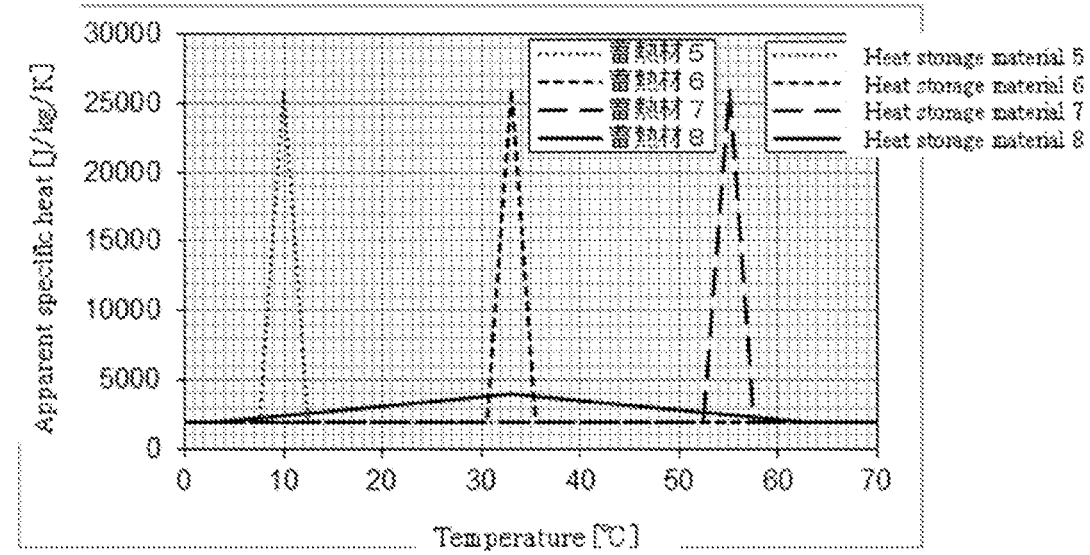

[Fig. 6]
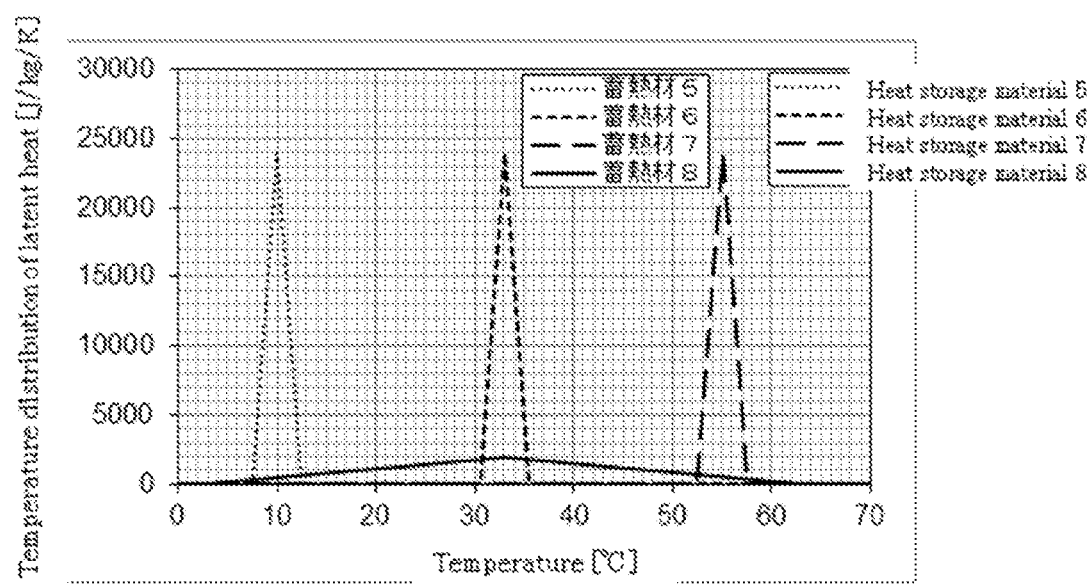
[Fig. 7]
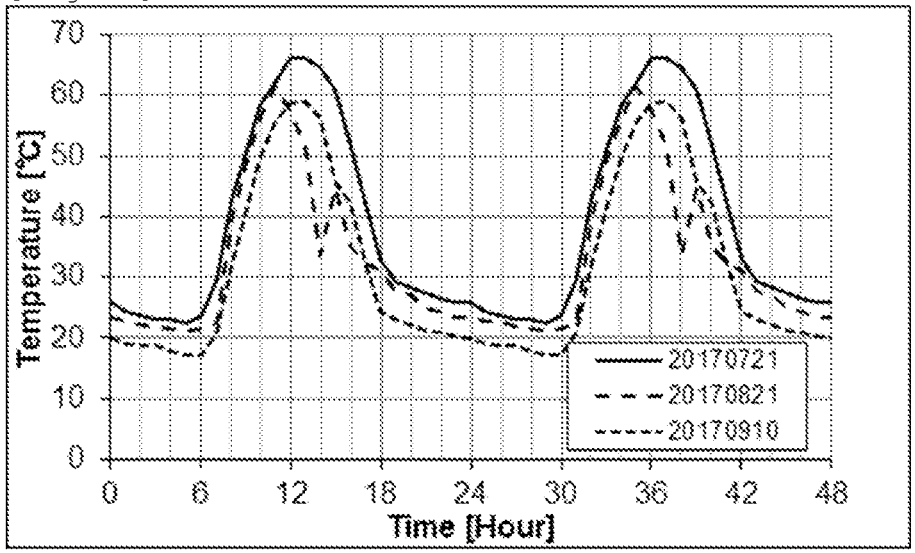

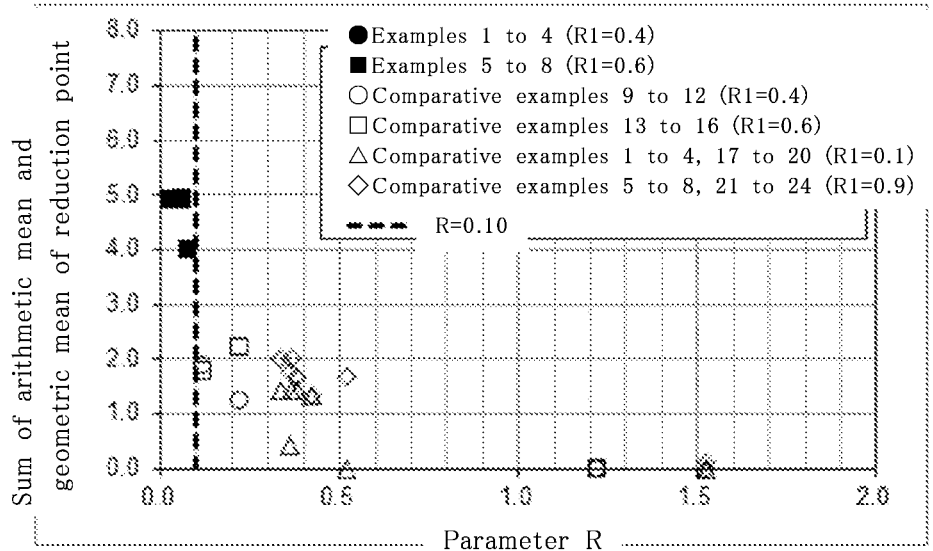
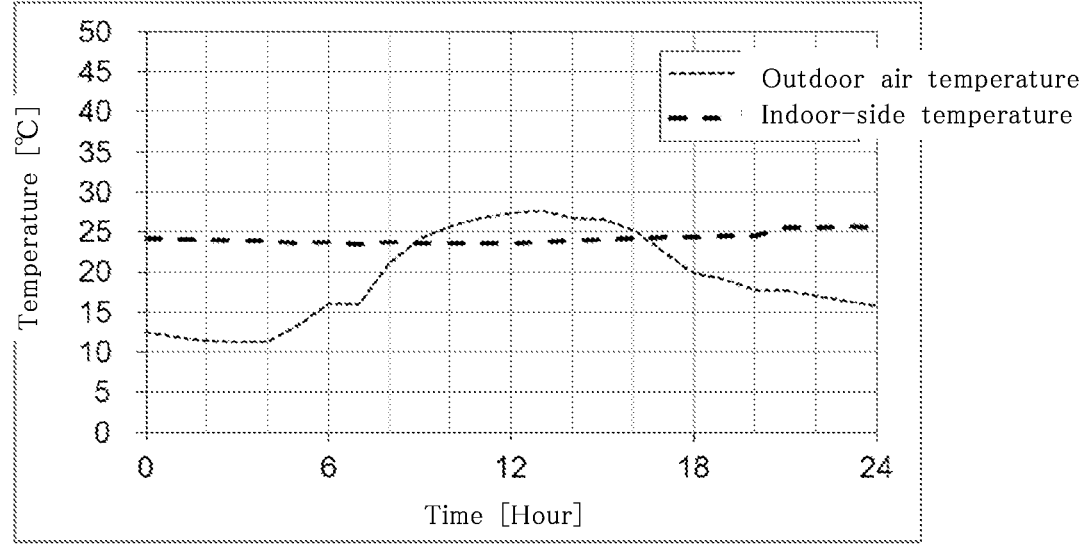

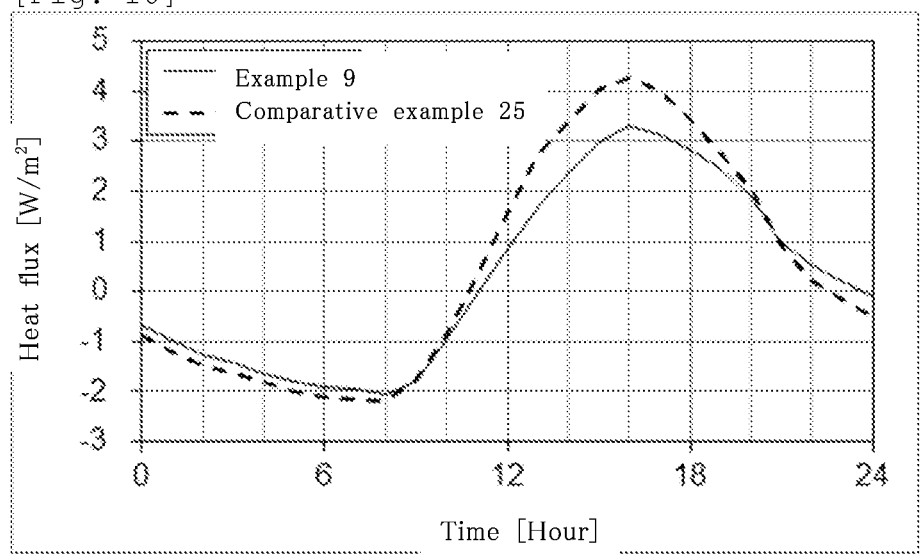
[Fig. 10]

ROOF MEMBER OR CEILING MEMBER, AND CONSTRUCTION

CROSS-REFERENCE TO RELATED APPLICATIONS

This application is a US non-provisional application, which claims the benefit of priority to Japanese Patent Application No. 2019-003258, filed Jan. 11, 2019, the content of which is incorporated herein by reference in its entirety.

BACKGROUND OF THE INVENTION

Field of the Invention

The present disclosure relates to a roof member or a ceiling member, and a construction including the roof member and/or the ceiling member.

Description of the Related Art

Constructions have been improved to have greater heat insulating properties in order to facilitate both indoor comfortability and energy saving for cooling and heating. However, there has been such a problem that building materials become too thick when the building materials attain sufficient heat insulating properties only by including a heat insulating material. To address this problem, recently proposed are such building materials that include a heat insulating material and a latent heat storage material in combination, thereby making it possible to utilize temperature differences between daytime and nighttime for lessening temperature changes in indoor environment or the like, thereby attaining greater energy saving properties.

For example, "AIJ Journal of Technology and Design", vol. 22, No. 52, 1027-1030 discloses that the indoor temperature change is smaller in a room surrounded with exterior walls including a combination of a latent heat storage material layer and a heat insulating material provided on an outdoor side with respect to the latent heat storage material layer while not including a heat insulating material on an indoor side with respect to the latent heat storage material layer, compared with a room surrounded with exterior walls including a heat insulating material but not a latent heat storage material layer.

Furthermore, JP-A-61-122354 discloses a building material including a combination of a heat insulating material positioned on an outdoor side and a heat storage material positioned on an indoor side. JP-A-61-122354 describes that, for reducing indoor temperature increases during daytime with the heat storage material, it is important that the heat storage material be located on the indoor side, and a heat insulating material should not be provided on the indoor side with respect to the heat storage material.

Any of these techniques described in the Patent and Non-Patent Literatures mentioned above aim to improve the energy saving property by providing the heat storage material on the indoor side with respect to the heat insulating material.

Furthermore, JP-A-9-174741 discloses a heat insulating panel including a heat storage layer and heat insulating layers respectively provided on both indoor and outdoor sides of the heat storage layer in order to alleviate bedewing within the heat insulating panel.

PRIOR ART DOCUMENT

Patent Document

[Patent Document 1] Japanese Unexamined Patent Application Publication No. 61-122354 (published on Jun. 10, 1986)

[Patent Document 2] Japanese Unexamined Patent Application Publication No. 09-174741 (published on Jul. 8, 1997)

Non-Patent Document

[Non-Patent Document 1] AIJ Journal of Technology and Design Vol. 22, No. 52, 1027-1030 (published on October 2016)

SUMMARY OF THE INVENTION

Recently, there has been a demand for a roof member and a ceiling member for improving energy saving property in such a situation that indoor temperature is continuously kept constant by use of cooling and heating equipment.

While the building materials described in the Patent and Non-Patent Literatures mentioned above are effective in reducing the indoor temperature changes caused in association with outdoor air temperature changes, the Patent and Non-Patent Literatures are silent as to whether or not the building materials, which function only in a temperature-changing environment, are effective in energy saving in such a situation that the indoor temperature is continuously kept constant by use of the cooling and heating equipment.

Furthermore, these Patent and Non-Patent Literatures are silent in that, under such a situation that the indoor temperature is kept constant by use of the cooling and heating equipment independently of the outdoor air temperature that changes between daytime and nighttime and from day to day, heat storage materials for roofs whose surface temperature would be heated to be higher than the outdoor air temperature by insolation and for ceilings influenced by a ceiling space that would be heated to be higher than the outdoor air temperature by insolation likewise, should have what kind of latent heat storage property in order to reduce influent and effluent heat amounts between indoor and outdoor environments thereby to reduce cooling and heating energy consumption.

In view of these, the present inventors found that these problems can be solved by configuring a roof member or a ceiling member to include a heat storage layer and heat insulating layers respectively on each of indoor and outdoor sides of the heat storage layer in such a manner that the heat storage layer is positioned at a certain position in the roof member or the ceiling member and is a heat storage layer having a specific latent heat storage property.

An object of the present disclosure is to provide a roof member or a ceiling member, which is capable of reducing cooling and heating energy consumption by reducing influent and effluent heat amounts between indoor and outdoor environments in such a situation that the indoor temperature is kept constant by use of cooling and heating equipment independently of the outdoor air temperature changes, and to provide a construction including the roof member and/or the ceiling member.

The present invention provides the followings.

[1] A member for roofing or ceiling, including:
an outdoor-side heat insulating layer (A);
an indoor-side heat insulating layer (B); and a heat storage layer between the outdoor-side heat insulating layer (A) and the indoor-side heat insulating layer (B), in which
R≤0.10 where R is represented by Equation (3):

$$R=2(R1-0.5)^2+(R2-1)^2+(R3-0.55)^2 \quad (3),$$

where R1 is represented by Equation (1):

$$R1=(Tb/Kb)/(Ta/Ka+Tb/Kb) \quad (1),$$

where Ka is a thermal conductivity of the outdoor-side heat insulating layer (A), Ta is a thickness of the outdoor-side heat insulating layer (A), Kb is a thermal conductivity of the indoor-side heat insulating layer (B), and Tb is a thickness of the indoor-side heat insulating layer (B), R2 is a ratio of a latent heat amount of the heat storage layer in a temperature range of 15° C. to 50° C. with respect to a latent heat amount of the heat storage layer in a temperature range of −10° C. to 60° C., and R3 is represented by Equation (2):

$$R3=L5/L20 \quad (2),$$

where L5 is a latent heat amount of the heat storage layer in a temperature range X, and L20 is a latent heat amount of the heat storage layer in a temperature range of (X'−10)° C. inclusive to (X'+10)° C. inclusive, X is a 5° C.-width temperature range in which the latent heat amount of the heat storage layer is the largest among latent heat amounts of given 5° C.-width temperature ranges within the temperature range of −10° C. to 60° C., and X' is a center temperature of the temperature range X.

[2] The member for roofing or ceiling according to [1], in which R1 is not less than 0.30 but not more than 0.70, R2 is not less than 0.85 but not more than 1.00, and R3 is not less than 0.30 but not more than 0.80.

[3] The member for roofing or ceiling according to [1] or [2], in which at least one layer selected from the group consisting of the outdoor-side heat insulating layer (A) and the indoor-side heat insulating layer (B) is a layer comprising a polystyrene foam, a rigid polyurethane foam or a phenol resin foam having a thermal conductivity of 0.03 W/(m·K) or less.

[4] The member for roofing or ceiling according to any one of [1] to [3], in which X' is not less than 15° C. but not more than 50° C.

[5] The member for roofing or ceiling according to any one of [1] to [4], in which the heat storage layer has a moisture permeability resistance of 900 m²h·mmHg/g or less.

[6] A construction including:
the member for roofing and/or ceiling according to any one of [1] to [5], in which
the outdoor-side heat insulating layer (A) included in the member for roofing and/or ceiling is disposed on an outdoor side of the construction and the indoor-side heat insulating layer (B) is disposed on an indoor side of the construction.

[7] Use of the member for roofing or ceiling according to any one of [1] to [5] as a roof or ceiling.

With the roof member and/or the ceiling member according to the present disclosure, in such a situation that indoor temperature is continuously kept constant by use of cooling and heating equipment, it is possible to facilitate reduction of influent and effluent heat amounts between indoor and outdoor environment independently of various outdoor air temperature changes, thereby making it possible to attain a construction achieving both of indoor comfortability and high energy saving effect.

BRIEF DESCRIPTION OF THE DRAWINGS

FIG. 1 is a vertical cross-sectional view of one embodiment of a roof member according to the present disclosure;

FIG. 2 is a vertical cross-sectional view illustrating sizes of one embodiment of the roof member according to the present disclosure;

FIG. 3 is a view illustrating temperature distributions of apparent specific heat of heat storage materials 1 to 4 used in Examples;

FIG. 4 is a view illustrating temperature distributions of latent heat in the heat storage materials 1 to 4 used in Examples;

FIG. 5 is a view illustrating temperature distributions of apparent specific heat of heat storage materials 5 to 8 used in Examples;

FIG. 6 is a view illustrating temperature distributions of latent heat in the heat storage materials 5 to 8 used in Examples;

FIG. 7 is a view illustrating an outdoor-side surface temperature in simulation;

FIG. 8 is a view illustrating overall properties of Examples 1 to 8 and Comparative Examples 1 to 24;

FIG. 9 is a view illustrating temperature conditions of Example 9 and Comparative Example 25; and FIG. 10 is a view illustrating experimental results of Example 9 and Comparative Example 25.

DETAILED DESCRIPTION OF THE PREFERRED EMBODIMENTS

Embodiments of a roof member and a ceiling member according to the present disclosure are described below, referring to the drawings. FIG. 1 is a view illustrating a roof member 1, which is one embodiment of the roof member according to the present disclosure. Note that the upper side of the drawings is an outdoor side and the lower side of the drawings is an indoor side.

The roof member and the ceiling member according to the present disclosure include an outdoor-side heat insulating layer (A) and an indoor-side heat insulating layer (B), and a heat storage layer between the outdoor-side heat insulating layer (A) and the indoor-side heat insulating layer (B), in which:
R≤0.10 where R is represented by Equation (3):

$$R=2(R1-0.5)^2+(R2-1)^2+(R3-0.55)^2 \quad (3).$$

R1, R2, and R3 are described below. The roof member or the ceiling member according to the present disclosure is prepared with an outdoor-side heat insulating layer (A) having a selected thermal conductivity and thickness, an indoor-side heat insulating layer (B) having a selected thermal conductivity and thickness, and the heat storage layer prepared from a selected material, in order that R may be not more than 0.10.

<R1>
R1 is represented by Equation (1).

$$R1=(Tb/Kb)/(Ta/Ka+Tb/Kb) \quad (1)$$

where Ka is a thermal conductivity of the outdoor-side heat insulating layer (A), Ta is a thickness of the outdoor-side heat insulating layer (A), Kb is a thermal conductivity of the indoor-side heat insulating layer (B), and Tb is a thickness of the indoor-side heat insulating layer (B).

R1 is adjustable by changing the thermal conductivity or thickness of the outdoor-side heat insulating layer (A), or the thermal conductivity or thickness of the indoor-side heat insulating layer (B).

R1 is preferably in a range of 0.30 to 0.70, and further preferably in a range of 0.35 to 0.65.

Thickness Ta of the outdoor-side heat insulating layer (A) is for example in a range of 10 mm to 150 mm, and further preferably in a range of 50 mm to 120 mm.

Thickness Tb of the indoor-side heat insulating layer (B) is for example in a range of 10 mm to 150 mm, and further preferably in a range of 50 mm to 120 mm.

The heat conductivities of the outdoor-side heat insulating layer (A) and the indoor-side heat insulating layer (B) are described below.

<R2>

R2 is a ratio of a latent heat amount of the heat storage layer in a temperature range of 15° C. to 50° C. with respect to a latent heat amount of the heat storage layer in a temperature range of −10° C. to 60° C.

R2 is preferably in a range of 0.85 to 1.00, and further preferably in a range of 0.95 to 1.00.

In this Specification, the latent heat amount is a value measured according to JSTM O6101:2018 (which is the standard of Japan Testing Center for Construction Materials) in the following manner.

A test piece is held between two flat hot plates whose temperature can be increased or decreased at a constant rate. (1) The hot plates are kept at 60° C. for 5 hours, then (2) cooled from 60° C. to −10° C. at a rate of 0.1° C./min, then (3) kept at −10° C. for 5 hours, and then (4) heated from −10° C. to 60° C. at a rate of 0.1° C./min. Latent heat amounts at these temperatures are worked out from a heat flow measured by a heat flow meter at Step (4).

In this Specification, specific heat means a value indicating a heat amount necessary to increase temperature of a material by 1K per unit mass of the material. Apparent specific heat means a value attained by adding a latent heat amount to the specific heat. The latent heat amount means a heat amount absorbed or released by solid-liquid phase transition. In this Specification, the latent heat amount is fusion enthalpy ($\Delta H$) observed within a specific temperature range.

<R3>

R3 is represented by Equation (2).

$$R3 = L5/L20 \quad (2)$$

where L5 is a latent heat amount of the heat storage layer in a temperature range X, and L20 is a latent heat amount of the heat storage layer in a temperature range of (X'−10)° C. inclusive to (X'+10)° C. inclusive, X is a 5° C.-width temperature range in which the latent heat amount of the heat storage layer is the largest among latent heat amounts of given 5° C.-width temperature ranges within the temperature range of −10° C. to 60° C., and X' is a center temperature of the temperature range X.

The latent heat amount for working out R3 is measured as below.

Latent heat amounts of the heat storage layer within the temperature range from −10° C. to 60° C. are measured thereby to measure latent heat amounts at every 1° C. for 5° C.-width temperature ranges, such as −10° C. to −5° C., −9° C. to −4° C., and −8° C. to −3° C. Among the latent heat amounts thus measured, a greatest latent heat amount is referred to as L5, and the 5° C.-width temperature range at which L5 is measured is referred to as X.

R3 is preferably in a range of 0.30 to 0.80, and further preferably in a range of 0.30 to 0.75.

X' is preferably not less than 15° C. but not more than 50° C., and further preferably not less than 20° C. but not more than 45° C.

R2 and R3 represent latent heat properties of the heat storage layer, respectively. The material of the heat storage layer is selected as appropriate in order that certain R2 and R3 may be attained.

The latent heat layer includes a latent heat storage material as described later. If the latent heat storage material is a low molecular latent heat storage material, R2 and R3 can be adjusted by:

1) using a combination of more than two types of low molecular latent heat storage materials having different melting points, 2) using a combination of a low molecular latent heat storage material and another low molecular compound, or 3) using a combination of a low molecular latent heat storage material and a high molecular latent heat storage material.

If the latent heat storage material is a high molecular latent heat storage material, R2 and R3 can be adjusted by selecting types and amounts of structural units in the high molecular latent heat storage material.

<Heat Insulating Layer>

In this Specification, the outdoor-side heat insulating layer (A) is a heat insulating layer provided on the outdoor side with respect to the heat storage layer in the roof member or the ceiling member according to the present disclosure.

In this Specification, the indoor-side heat insulating layer (B) is a heat insulating layer provided on the indoor side with respect to the heat storage layer in the roof member or the ceiling member according to the present disclosure.

The "indoor side" of the ceiling member means the side closer to an indoor environment that is a living space for people. The "outdoor side" of the ceiling member means the opposite side of the "indoor side".

Here, the "outdoor side" of the roof member or the ceiling member would have a surface temperature higher than outdoor air temperature as a result of insolation. Therefore, the roof member and the ceiling member are required to have a high heat insulating property.

In this Specification, the heat insulating layers are a layer being 0.05 W/(m·K) or less in thermal conductivity.

In this Specification, the thermal conductivity is a coefficient indicating easiness of heat transfer, and means a heat amount that would be transferred in unit area in unit time if there is a temperature difference of 1K per unit thickness. The thermal conductivity is measured according to ASTM E1530 by a heat flow method.

The outdoor-side heat insulating layer (A) and the indoor-side heat insulating layer (B) are not particularly limited as to materials constituting the heat insulating layers (A) and (B), as long as the heat conductivities of the heat insulating layers (A) and (B) are 0.05 W/(m·K) or less.

Examples of the materials of the outdoor-side heat insulating layer (A) and the indoor-side heat insulating layer (B) include resin foam.

Examples of the resin foam include polystyrene foam, rigid polyurethane foam, acrylic resin foam, phenol resin foam, polyethylene resin foam, foam rubber, foam ceramic, and the like.

It is preferable that the thermal conductivity of the outdoor-side heat insulating layer (A) be 0.03 W/(m·K) or less. It is preferable that the thermal conductivity of the indoor-side heat insulating layer (B) be 0.03 W/(m·K) or less.

The heat conductivities of the outdoor-side heat insulating layer (A) and the indoor-side heat insulating layer (B) are independent from each other. Examples of preferable materials having a low thermal conductivity and used for the heat insulating layers include polystyrene foam, phenol resin foam, and rigid polyurethane foam. It is preferable that the outdoor-side heat insulating layer (A) and/or the indoor-side heat insulating layer (B) be a layer including polystyrene foam, phenol resin foam, or rigid polyurethane foam whose thermal conductivity is 0.03 W/(m·K) or less. For the sake of installability, it is preferable that the outdoor-side heat insulating layer (A) and/or the indoor-side heat insulating layer (B) be board-shaped foam and pre-fabricated by being attached to the heat storage layer.

<Heat Storage Layer>

The heat storage layer is a layer having heat storage property due to latent heat.

The heat storage layer is preferably a layer having a latent heat amount per area of 15 kJ/m$^2$ or more for the temperature range of −10° C. to 60° C. The latent heat amount per area of the heat storage layer for the temperature range of −10° C. to 60° C. is more preferably 25 kJ/m$^2$ or more, and further preferably 50 kJ/m$^2$ or more.

The heat storage layer has a thickness Ths, for example, in a range of 0.50 mm to 7.0 mm and preferably in a range of 1.0 mm to 5.0 mm. As described later, in the case of a configuration including a plurality of the heat storage layers, the thickness Ths is sum of the thicknesses of the plurality of the heat storage layers.

It is preferable that the heat storage layer have a density of 1500 kg/m$^3$ or less, for the sake of reducing weights of the roof member and the ceiling member. The density is measured by a water displacement method, a pycnometer method, a sink-float method, or a density-gradient tube method (JIS K7112).

It is preferable that the heat storage layer have such a moisture permeability that a moisture permeability resistance is 900 m$^2$·h·mmHg/g or less for the sake of alleviating bedewing. Although the heat storage layer is not particularly limited in terms of its shape as long as the heat storage layer has such desirable moisture permeability, it is preferable that the heat storage layer have through holes. Examples of the heat storage layer include a heat storage layer prepared with such through holes formed by physically processing a sheet, a heat storage layer prepared with such through holes formed via foaming when a material is foamed to a shape, and a fibrous heat storage layer such as a non-woven cloth. For forming such through holes by physically processing a sheet, it is possible to form the through holes in the sheet by using a roller with protrusions on producing the sheet, or to post-fabricate the through holes, that is, to form the through holes in the sheet by using needles, a punching machine, an interstice of the roller with protrusions, or the like after forming the sheet without the through holes. The through holes individually have an area preferably not less than 0.03 mm$^2$ but not more than 1.00 mm$^2$, and further preferably not less than 0.04 mm$^2$ but not more than 0.64 mm$^2$. The through holes are distanced from each other with minimum intervals preferably not less than 1.5 mm but not more than 6.0 mm, and further preferably not less than 2.0 mm but not more than 5.0 mm. It is possible to achieve a greater effect of alleviating the bedewing by tapering the through holes with a wider opening on the indoor side by using a roller or a punching machine with tapered protrusions. In terms of a tapering angle, the tapered protrusions are preferably angled by not less than 45° but not more than 70°, and further preferably by not less than 50° but not more than 65°. Examples of shapes of the tapered protrusions include a quadrangular pyramid, a circular pyramid, and the like. Furthermore, apart from the use of through holes, it is also possible to give the heat storage layer a desirable moisture permeability by making incisions, slits, or the like in the heat storage layer.

The moisture permeability resistance is measured by a cup method according to JIS A1324.

The heat storage layer includes a latent heat storage material. In this Specification, the latent heat storage material is a material that exhibits latent heat storage due to phase transition (hereinafter, referred to as "heat storage material"). Examples of the latent heat storage materials include low molecular latent heat storage materials and high molecular latent heat storage materials.

Examples of the low molecular latent heat storage materials include organic low molecular latent heat storage materials and inorganic low molecular latent heat storage materials.

Examples of the organic low molecular latent heat storage materials include paraffin, long-chain fatty acids, long-chain alcohols, long-chain fatty acid esters, sugar alcohols, and the like. These materials may be used in such a form that they are sealed in organic micro capsules, fixed with a gelling agent, or sealed in plastic vessels or the like.

Examples of the inorganic low molecular latent heat storage materials include inorganic salt hydrates and the like. Examples of the inorganic salt hydrates include, but not limited to, lithium perchlorate hydrate, sodium hydroxide hydrate, potassium fluoride hydrate, lithium nitrate hydrate, calcium chloride hydrate, sodium sulfate hydrate, sodium carbonate hydrate, sodium hydrogenphosphate hydrate, sodium zinc nitrate hydrate, calcium bromide hydrate, and the like. These are preferably used in such a form that they are sealed in plastic vessels or the like.

Examples of such high molecular latent heat storage materials include polymers side-chained with a long-chain alkyl group or a long-chain ether group, which may be branched and may be substituted with a functional group. Examples of the polymers include, but not limited to, polymers whose main constituent is (meth)acrylate, side-chained with a long-chain alkyl group or a long-chain ether group, which may be branched and may be substituted with a functional group, polymers whose main constituent is a vinyl ester main chain, side-chained with a long-chain alkyl group or a long-chain ether group, which may be branched and may be substituted with a functional group, polymers whose main constituent is a vinyl ether main chain, side-chained with a long-chain alkyl group or a long-chain ether group, which may be branched and may be substituted with a functional group, and polymers whose main constituent is a polyolefin main chain, side-chained with a long-chain alkyl group or a long-chain ether group, which may be branched and may be substituted with a functional group. The long-chain alkyl group, which may be branched and may be substituted with a functional group, is preferable as the side chain, while the polymers whose main constituent is (meth)acrylate or polyolefin main chain are preferable. Examples of the high molecular latent heat storage materials include polymers described in JP-A-2015-091903, WO 2016/098674, and WO 2017/217419.

Two or more of the heat storage materials may be used in combination. The heat storage layer may include a sensible heat storage material. Examples of the sensible heat storage material include concrete, crushed stone, iron, copper, steel, and polyethylene.

<Roof Member and Ceiling Member>

The roof member and the ceiling member are preferably configured such that Ths/(Ta+Tb) is in a range of 0.01 to 0.05.

The roof member and the ceiling member may be configured such that the outdoor-side heat insulating layer (A) and/or the indoor-side heat insulating layer (B) independently includes two or more layers of heat insulating layers.

In such a configuration where the roof member or the ceiling member is configured such that the outdoor-side heat insulating layer (A) and/or the indoor-side heat insulating layer (B) independently includes two or more layers of heat insulating layers, R1 is replaced with R1' represented by Equation (1').

$$R1' = \left\{\sum_{q=1}^{n}(Tbq/Kbq)\right\} / \left\{\sum_{p=1}^{m}(Tap/Kap) + \sum_{q=1}^{n}(Tbq/Kbq)\right\} \quad (1')$$

The roof member and the ceiling member may include two or more heat storage layers. In such a configuration where the roof member or the ceiling member includes two or more heat storage layers, the two or more heat storage layers may include more than two types of heat storage layers laminated adjacently. In such a configuration where the roof member or the ceiling member includes two or more heat storage layers, the roof member or the ceiling member may include, between the heat storage layers, a layer other than the heat storage layers.

In the configuration where the roof member and/or the ceiling member includes two or more heat storage layers, the latent heat amount measurement for working out R2 and R3 is carried out with all the heat storage layers laminated.

The roof member and the ceiling member may additionally include a layer other than the outdoor-side heat insulating layer (A), the heat storage layer, and the indoor-side heat insulating layer (B).

The outdoor-side heat insulating layer (A) and the heat storage layer may be positioned adjacently or not adjacently to each other. The roof member and the ceiling member may additionally include, between the outdoor-side heat insulating layer (A) and the heat storage layer, the layer other than the outdoor-side heat insulating layer (A), the heat storage layer, and the indoor-side heat insulating layer (B).

The indoor-side heat insulating layer (B) and the heat storage layer may be positioned adjacently or not adjacently to each other. The roof member and the ceiling member may additionally include, between the indoor-side heat insulating layer (B) and the heat storage layer, the layer other than the outdoor-side heat insulating layer (A), the heat storage layer, and the indoor-side heat insulating layer (B).

Examples of the layer other than the outdoor-side heat insulating layer (A), the heat storage layer, and the indoor-side heat insulating layer (B) include a decorative layer such as wallpaper and flooring, a flame retardant layer such as plasterboard, an exterior wall layer such as mortar, an adhesive layer, an air layer, and the like.

Thicknesses of the outdoor-side heat insulating layer (A) and the indoor-side heat insulating layer (B) in the roof member and the ceiling member are such that (Ta/Ka+Tb/Kb) is preferably in a range of 0.70 to 1.00, and further preferably in a range of 0.80 to 1.00, where (Ta/Ka+Tb/Kb) is a ratio of the thicknesses over heat resistance of the roof or the ceiling as a whole. If (Ta/Ka+Tb/Kb), which is the ratio of the thicknesses over the heat resistance of the roof or the ceiling as a whole, is 0.70 or more, influence of the "other layer" in the roof member or the ceiling member onto influent and effluent heat amounts into and out of indoor environment would be small.

The heat resistances of the roof or the ceiling as a whole are worked out by working out ratios of thicknesses over heat conductivities of the respective layers, and summing the ratios of all the layers.

Examples of production methods for the roof member or the ceiling member include:

Multi-layer extrusion molding for forming the outdoor-side heat insulating layer (A), the heat storage layer, and the indoor-side heat insulating layer (B) integrally; and Forming the outdoor-side heat insulating layer (A), the heat storage layer, and the indoor-side heat insulating layer (B) independently, and integrating these layers thereafter. In the case of the production method including forming the outdoor-side heat insulating layer (A), the heat storage layer, and the indoor-side heat insulating layer (B) independently, and integrating these layers thereafter, the step of integrating may be carried out at a building site in such a way that the heat insulating layers and the heat storage layer are attached with each other and installed thereafter, or may be carried out in a factory or the like place, so that the integrated layers are sent to a building site to be installed there.

<Construction>

The roof member can be used to form a roof including the roof member. The ceiling member can be used to form ceiling including the ceiling member. In general, the roof or ceiling includes the roof member or the ceiling member, and a structural member for adding strength. It is possible to form the roof or ceiling by laminating the roof member or the ceiling member, and the structural member, or by laying the roof member or the ceiling member. Examples of materials of the structural member include woods, concrete, and metal.

The roof member can be used to form a construction in which the roof member is placed with the outdoor-side heat insulating layer (A), which is included in the roof member, disposed on the outdoor side and with the indoor-side heat insulating layer (B) disposed on the indoor side. The ceiling member can be used to form a construction in which the ceiling member is placed with the outdoor-side heat insulating layer (A), which is included in the ceiling member, disposed on the outdoor side and with the indoor-side heat insulating layer (B) disposed on the indoor side. A construction may be configured to include a roof including the roof member and a ceiling including the ceiling member.

EXAMPLES

In Example 9 and Comparative Example 25, the following properties were measured by the following methods.

(1) Thermal Conductivity

Thermal conductivity was measured by the heat flow method according to ASTM E1530.

(2) Latent Heat Amount

A value is measured according to JSTM O6101:2018 (which is the standard of Japan Testing Center for Construction Materials) in the following conditions and analyzed.

A test piece is held between two flat hot plates whose temperature can be increased or decreased at a constant rate. (1) The hot plates are kept at 60° C. for 5 hours, then (2) cooled from 60° C. to −10° C. at a rate of 0.1° C./min, then (3) kept at −10° C. for 5 hours, and then (4) heated from −10° C. to 60° C. at a rate of 0.1° C./min. The apparent specific heat and latent heat at these temperatures are worked out from a heat flow measured by a heat flow meter at Step (4).

(3) Moisture Permeability Resistance

Moisture permeability resistance was measured at a measuring temperature of 15° C. by the cup method according to JIS A1324.

(4) Influent Heat Amount and Influent Heat Flux

A heat sensor (heat flow meter) HF-30s made by EKO Instruments B.V. was placed on the indoor side of a lamination placed as a part of a roof of a house for experiment, and influent heat flux into an attic space via the roof was measured.

(5) Indoor-Side Temperature of Roof and Outdoor Air Temperature

Thermocouple was placed on the indoor side of the roof of the house for experiment, and indoor-side temperature was measured.

Furthermore, a temperature measurement data logger TR7wf made by T&D Corporation was placed in an instrumental shelter placed next to the house for experiment, and the outdoor air temperature was measured.

Example 9

The experiment was carried out in a house for experiment built in Chino city in Nagano prefecture. A lamination (31) was placed as a part of a roof of the house for experiment, the lamination (31) including an outdoor-side heat insulating layer (A31), an indoor-side heat insulating layer (B31), and a heat storage layer (C31) between the outdoor-side heat insulating layer (A31) and the indoor-side heat insulating layer (B31). The house for experiment had a total floor area of 71.2 m² and was one-story.

The outdoor-side heat insulating layer (A31) and the indoor-side heat insulating layer (B31) were extruded polystyrene foam heat-retaining materials (with thickness of 120 mm) defined under JIS A9511, respectively. The outdoor-side heat insulating layer (A31) and the indoor-side heat insulating layer (B31) each have a thermal conductivity of 0.024 W/m/K. Therefore, R1 was 0.5. Furthermore, the heat storage layer (C31) was such that its latent heat amount was 51000 J/kg in a temperature range of −10° C. to 60° C. and 50100 J/kg in a temperature range of 15° C. to 50° C., L5 was 21700 J/kg, X' was 31° C., and L20 was 33100 J/kg. Therefore, R2 was 0.98, R3 was 0.65 and R was 0.010. The heat storage layer (C31) was 5.0 mm in thickness and 0.19 W/m/K in thermal conductivity.

It should be noted that the heat storage layer was prepared in the following manner. By using a twin-screwed extruder, 80 parts by weight of a copolymer including ethylene-derived structural units, octadecylacrylate-derived structural units, and methylacrylate-derived structural units, 20 parts by weight of polypropylene, an organic peroxide, and a cross-linking auxiliary agent were melted, mixed, and kneaded, thereby obtaining a resin composition thus cross-linked. The resin composition was shaped in a sheet shape, thereby obtaining the heat storage layer.

The experiment was carried out in such a manner that central cooling equipment installed in the house for experiment was set to a setting temperature of 25° C., and continuously operated for 24 hours, and an influent heat amount into the attic space of the roof on Jun. 25, 2018 were evaluated. The outdoor air temperature and the indoor-side temperature of the lamination on Jun. 25, 2018 are illustrated in FIG. 9. Influent and effluent heat amounts from the start of the experiment to 24 hours were measured. Results of the experiment are illustrated in FIG. 10 and on Table 1.

Comparative Example 25

As a part of the roof of the house for experiment used in Example 9, a lamination (32) including an outdoor-side heat insulating layer (A32) and an indoor-side heat insulating layer (B32) was placed.

The outdoor-side heat insulating layer (A32) and the indoor-side heat insulating layer (B32) were extruded polystyrene foam heat-retaining materials (with thickness of 120 mm) defined under JIS A9511, respectively. The outdoor-side heat insulating layer (A32) and the indoor-side heat insulating layer (B32) each have a thermal conductivity of 0.024 W/m/K. The two sheets of extruded polystyrene foam heat-retaining materials were laminated to form the lamination (32). The lamination (32) did not include a heat storage layer.

The experiment was carried out in such a manner that central cooling equipment installed in the house for experiment was set to a setting temperature of 25° C., and continuously operated for 24 hours, and an influent heat amount into the attic space of the roof on Jun. 25, 2018 were evaluated. The outdoor air temperature and the indoor-side temperature of the lamination on Jun. 25, 2018 are illustrated in FIG. 9. Influent and effluent heat amounts from the start of the experiment to 24 hours were measured. Results of the experiment are illustrated in FIG. 10 and on Table 1.

TABLE 1

|  | Influent heat amount [Wh/m²/Day] | Influent heat amount reduction ratio compared with Comparative Example 25 [%] | Influent heat flux at peak [W/m²] (Time of peak occurrence) | Influent heat flux reduction ratio compared with Comparative Example 25 [%] |
| --- | --- | --- | --- | --- |
| Example 9 | 23.1 | 21.4 | 3.3 (16:00) | 23.3 |
| Comparative Example 25 | 29.4 | — | 4.3 (16:00) | — |

Example 9 attained 21.4% reduction of the influent heat amount with respect to Comparative Example 25. Furthermore, Example 9 attained 23.3% reduction of the influent heat flux at peak with respect to Comparative Example 25. These demonstrated that, in a construction in which indoor temperature is kept constant by cooling equipment, the present disclosure can facilitate reduction of an influent heat amount, thereby reducing cooling load and attaining high saving energy effect.

Example 10

A resin composition equivalent to the resin composition constituting the heat storage layer of Example 9 was shaped into a sheet of 1 mm in thickness. By passing the sheet through an interstice between a roller A with quadrangular pyramid protrusions (shape of quadrangular pyramid: quadrangular pyramid with a square base of 2.35 mm×2.35 mm and a height of 1.64 mm) on its surface, and roller B configured to accept the protrusions of the roller A, a heat storage layer (C33) having through holes was prepared. The formation of the through holes was carried out by using the rollers A and B adjusted to a surface temperature of 60° C. Moisture permeability resistance of the heat storage layer (C33) was measured at 15° C. under 90% humidity according to JIS A1324 by the cup method. The moisture permeability resistance was 47 m$^2$h·mmHg/g.

A lamination (33) including the outdoor-side heat insulating layer (A31) and the indoor-side heat insulating layer (B31) of Example 9, and the heat storage layer (C33) between the outdoor-side heat insulating layer (A31) and the indoor-side heat insulating layer (B31) was placed as a part of the roof of the house for experiment, and an experiment was carried out under an environment similar to that of Example 9, thereby finding that influent heat amount observed herein was similar to that observed in Example 9.

Examples 1 to 8 and Comparative Examples 1 to 24 carried out computer-based simulation on influent and effluent heat into and out of indoor environment surrounded by the lamination (roof member) as illustrated in FIG. 1.

The simulation was carried out by using thermal conductivity analysis feature of LS-DYNA V971 R8.1.0 made by Livermore Software Technology Corporation. Time integration was carried out by a full-implicit method and a matrix computation solver used herein was a symmetric direct solver.

For indoor-side surface temperature of the lamination, indoor temperatures of three levels, namely 24° C., 26° C., and 28° C. were selected, taking into consideration options that indoor space users might select. For outdoor-side surface temperature of the lamination, outdoor air temperatures of a high-temperature day (July 21st), a low-temperature day (September 10th), and an intermediate-temperature day (August 21st) were selected from the summer time of 2017 in Matsumoto city, Nagano prefecture, and a product of an amount of global solar radiation, outdoor-side surface heat resistance of 0.04 m$^2$K/W, and normal emittance of 0.9 was added to the outdoor air temperatures considering the influence of insolation, thereby setting three levels of outdoor-side surface temperatures. The simulation was carried out based on the three levels of the indoor-side surface temperatures and three levels of outdoor-side surface temperatures. The three levels of outdoor-side surface temperatures are illustrated in FIG. 7.

Note that the simulation was carried out in such a manner that the lamination was kept constantly at 25° C. as a whole at the start of simulation, and the properties of the lamination were evaluated by simulating a heat amount influent into the indoor environment from 24 hours to 48 hours.

In addition, a lamination including a layer not having latent heat in the temperature range of −10° C. to 60° C. instead of the heat storage layer of the lamination of each Example was also simulated in a similar manner to work out a heat amount influent into the indoor environment. In each Example, an influent heat amount reduction ratio=100 (Z'−Z)/Z, where Z [Wh/m$^2$/Day] is a heat amount influent into the indoor environment in the case where the lamination of that Example was used, and Z' [Wh/m$^2$/Day] is a heat amount influent into the indoor environment in the case where the lamination including the layer not having latent heat in the temperature range of −10° C. to 60° C. was used instead of the heat storage layer of the lamination of that Example. Furthermore, "influent heat amount reduction points" are defined as follows: if the influent heat amount reduction ratio was less than 1%, the point was "0"; if the influent heat amount reduction ratio was not less than 1% but less than 5%, the point was "1"; if the influent heat amount reduction ratio was not less than 5% but less than 10%, the point was "2"; if the influent heat amount reduction ratio was not less than 10% but less than 20%, the point was "3"; and if the influent heat amount reduction ratio was not less than 20%, the point was "4". Furthermore, "overall properties" are indicated as a sum of an arithmetic mean of the influent heat amount reduction points under respective conditions and a geometric mean of the influent heat amount reduction points under respective conditions. The arithmetic mean of the influent heat amount reduction points also includes high performance observed under a specific condition and thereby indicates the values of property under various usage conditions, whereas the geometric mean of the influent heat amount reduction points indicates the value of property uniformly observed under all the condition, thereby being steadily observable under any outdoor conditions and any indoor conditions.

Example 1

Simulation of a lamination (1) including an outdoor-side heat insulating layer (A1), an indoor-side heat insulating layer (B1), and a heat storage layer (C1) between the outdoor-side heat insulating layer (A1) and the indoor-side heat insulating layer (B1) was carried out. Table 2 shows density, sensible heat, and thermal conductivity of each of the outdoor-side heat insulating layer (A1), the indoor-side heat insulating layer (B1), and the heat storage layer (C1). FIG. 3 illustrates apparent specific heat of a heat storage material 1 constituting the heat storage layer (C1) of this Example, whereas FIG. 4 illustrates temperature distribution of latent heat of the heat storage material 1.

The lamination (1) was configured according to a layer configuration 2 shown in Table 3 in terms of thickness Ta of the outdoor-side heat insulating layer (A1), thickness Tb of the indoor-side heat insulating layer (B1), and thickness Ths of the heat storage layer (C1).

An influent heat amount into the indoor environment is shown on Table 5. An influent heat amount reduction ratio is shown on Table 9. An influent heat amount reduction point is shown on Table 13. An overall property is shown on table 16.

Example 2

Simulation was carried out in a similar manner as in Example 1, except that the heat storage material constituting the heat storage layer was changed to a heat storage material 2. FIG. 4 illustrates temperature distribution of latent heat of the heat storage material 2. The heat storage material 2 was identical with the heat storage material 1 in terms of density, sensible heat, and thermal conductivity. Results of the simulation are shown on Table 5, Table 9, Table 13, and Table 16.

Example 3

Simulation was carried out in a similar manner as in Example 1, except that the heat storage material constituting the heat storage layer was changed to a heat storage material 3. FIG. 4 illustrates temperature distribution of latent heat of the heat storage material 3. The heat storage material 3 was identical with the heat storage material 1 in terms of density, sensible heat, and thermal conductivity. Results of the simulation are shown on Table 5, Table 9, Table 13, and Table 16.

Example 4

Simulation was carried out in a similar manner as in Example 1, except that the heat storage material constituting the heat storage layer was changed to a heat storage material 4. FIG. 4 illustrates temperature distribution of latent heat of the heat storage material 4. The heat storage material 4 was identical with the heat storage material 1 in terms of density, sensible heat, and thermal conductivity. Results of the simulation are shown on Table 5, Table 9, Table 13, and Table 16.

Example 5

Simulation was carried out in a similar manner as in Example 1, except that the thickness Ta of the outdoor-side heat insulating layer, the thickness Tb of the indoor-side heat insulating layer, and the thickness Ths of the heat storage layer were changed to those of the layer configuration 3 as shown on Table 3. Results of the simulation are shown on Table 6, Table 10, Table 14, and Table 16.

Example 6

Simulation was carried out in a similar manner as in Example 2, except that the thickness Ta of the outdoor-side heat insulating layer, the thickness Tb of the indoor-side heat insulating layer, and the thickness Ths of the heat storage layer were changed to those of the layer configuration 3 as shown on Table 3. Results of the simulation are shown on Table 6, Table 10, Table 14, and Table 16.

Example 7

Simulation was carried out in a similar manner as in Example 3, except that the thickness Ta of the outdoor-side heat insulating layer, the thickness Tb of the indoor-side heat insulating layer, and the thickness Ths of the heat storage layer were changed to those of the layer configuration 3 as shown on Table 3. Results of the simulation are shown on Table 6, Table 10, Table 14, and Table 16.

Example 8

Simulation was carried out in a similar manner as in Example 4, except that the thickness Ta of the outdoor-side heat insulating layer, the thickness Tb of the indoor-side heat insulating layer, and the thickness Ths of the heat storage layer were changed to those of the layer configuration 3 as shown on Table 3. Results of the simulation are shown on Table 6, Table 10, Table 14, and Table 16.

Comparative Example 1

Simulation was carried out in a similar manner as in Example 1, except that the thickness Ta of the outdoor-side heat insulating layer, the thickness Tb of the indoor-side heat insulating layer, and the thickness Ths of the heat storage layer were changed to those of the layer configuration 1 as shown on Table 3. Results of the simulation are shown on Table 4, Table 8, Table 12, and Table 16.

Comparative Example 2

Simulation was carried out in a similar manner as in Example 2, except that the thickness Ta of the outdoor-side heat insulating layer, the thickness Tb of the indoor-side heat insulating layer, and the thickness Ths of the heat storage layer were changed to those of the layer configuration 1 as shown on Table 3. Results of the simulation are shown on Table 4, Table 8, Table 12, and Table 16.

Comparative Example 3

Simulation was carried out in a similar manner as in Example 3, except that the thickness Ta of the outdoor-side heat insulating layer, the thickness Tb of the indoor-side heat insulating layer, and the thickness Ths of the heat storage layer were changed to those of the layer configuration 1 as shown on Table 3. Results of the simulation are shown on Table 4, Table 8, Table 12, and Table 16.

Comparative Example 4

Simulation was carried out in a similar manner as in Example 4, except that the thickness Ta of the outdoor-side heat insulating layer, the thickness Tb of the indoor-side heat insulating layer, and the thickness Ths of the heat storage layer were changed to those of the layer configuration 1 as shown on Table 3. Results of the simulation are shown on Table 4, Table 8, Table 12, and Table 16.

Comparative Example 5

Simulation was carried out in a similar manner as in Comparative Example 1, except that the thickness Ta of the outdoor-side heat insulating layer, the thickness Tb of the indoor-side heat insulating layer, and the thickness Ths of the heat storage layer were changed to those of the layer configuration 4 as shown on Table 3. Results of the simulation are shown on Table 7, Table 11, Table 15, and Table 16.

Comparative Example 6

Simulation was carried out in a similar manner as in Comparative Example 2, except that the thickness Ta of the outdoor-side heat insulating layer, the thickness Tb of the indoor-side heat insulating layer, and the thickness Ths of the heat storage layer were changed to those of the layer configuration 4 as shown on Table 3. Results of the simulation are shown on Table 7, Table 11, Table 15, and Table 16.

Comparative Example 7

Simulation was carried out in a similar manner as in Comparative Example 3, except that the thickness Ta of the outdoor-side heat insulating layer, the thickness Tb of the indoor-side heat insulating layer, and the thickness Ths of the heat storage layer were changed to those of the layer configuration 4 as shown on Table 3. Results of the simulation are shown on Table 7, Table 11, Table 15, and Table 16.

Comparative Example 8

Simulation was carried out in a similar manner as in Comparative Example 4, except that the thickness Ta of the outdoor-side heat insulating layer, the thickness Tb of the indoor-side heat insulating layer, and the thickness Ths of the heat storage layer were changed to those of the layer configuration 4 as shown on Table 3. Results of the simulation are shown on Table 7, Table 11, Table 15, and Table 16.

Comparative Example 9

Simulation was carried out in a similar manner as in Example 1, except that the heat storage material constituting the heat storage layer was changed to a heat storage material 5. FIG. 6 illustrates temperature distribution of latent heat of the heat storage material 5. The heat storage material 5 was identical with the heat storage material 1 in terms of density, sensible heat, and thermal conductivity. Results of the simulation are shown on Table 18, Table 22, Table 26, and Table 29.

Comparative Example 10

Simulation was carried out in a similar manner as in Example 1, except that the heat storage material constituting the heat storage layer was changed to a heat storage material 6. FIG. 6 illustrates temperature distribution of latent heat of the heat storage material 6. The heat storage material 6 was identical with the heat storage material 1 in terms of density, sensible heat, and thermal conductivity. Results of the simulation are shown on Table 18, Table 22, Table 26, and Table 29.

Comparative Example 11

Simulation was carried out in a similar manner as in Example 1, except that the heat storage material constituting the heat storage layer was changed to a heat storage material 7. FIG. 6 illustrates temperature distribution of latent heat of the heat storage material 7. The heat storage material 7 was identical with the heat storage material 1 in terms of density, sensible heat, and thermal conductivity. Results of the simulation are shown on Table 18, Table 22, Table 26, and Table 29.

Comparative Example 12

Simulation was carried out in a similar manner as in Example 1, except that the heat storage material constituting the heat storage layer was changed to a heat storage material 8. FIG. 6 illustrates temperature distribution of latent heat of the heat storage material 8. The heat storage material 8 was identical with the heat storage material 1 in terms of density, sensible heat, and thermal conductivity. Results of the simulation are shown on Table 18, Table 22, Table 26, and Table 29.

Comparative Example 13

Simulation was carried out in a similar manner as in Comparative Example 9, except that the thickness Ta of the outdoor-side heat insulating layer, the thickness Tb of the indoor-side heat insulating layer, and the thickness Ths of the heat storage layer were changed to those of the layer configuration 3 as shown on Table 3. Results of the simulation are shown on Table 19, Table 23, Table 27, and Table 29.

Comparative Example 14

Simulation was carried out in a similar manner as in Comparative Example 10, except that the thickness Ta of the outdoor-side heat insulating layer, the thickness Tb of the indoor-side heat insulating layer, and the thickness Ths of the heat storage layer were changed to those of the layer configuration 3 as shown on Table 3. Results of the simulation are shown on Table 19, Table 23, Table 27, and Table 29.

Comparative Example 15

Simulation was carried out in a similar manner as in Comparative Example 11, except that the thickness Ta of the outdoor-side heat insulating layer, the thickness Tb of the indoor-side heat insulating layer, and the thickness Ths of the heat storage layer were changed to those of the layer configuration 3 as shown on Table 3. Results of the simulation are shown on Table 19, Table 23, Table 27, and Table 29.

Comparative Example 16

Simulation was carried out in a similar manner as in Comparative Example 12, except that the thickness Ta of the outdoor-side heat insulating layer, the thickness Tb of the indoor-side heat insulating layer, and the thickness Ths of the heat storage layer were changed to those of the layer configuration 3 as shown on Table 3. Results of the simulation are shown on Table 19, Table 23, Table 27, and Table 29.

Comparative Example 17

Simulation was carried out in a similar manner as in Comparative Example 13, except that the thickness Ta of the outdoor-side heat insulating layer, the thickness Tb of the indoor-side heat insulating layer, and the thickness Ths of the heat storage layer were changed to those of the layer configuration 1 as shown on Table 3. Results of the simulation are shown on Table 17, Table 21, Table 25, and Table 29.

Comparative Example 18

Simulation was carried out in a similar manner as in Comparative Example 14, except that the thickness Ta of the outdoor-side heat insulating layer, the thickness Tb of the indoor-side heat insulating layer, and the thickness Ths of the heat storage layer were changed to those of the layer configuration 1 as shown on Table 3. Results of the simulation are shown on Table 17, Table 21, Table 25, and Table 29.

Comparative Example 19

Simulation was carried out in a similar manner as in Comparative Example 15, except that the thickness Ta of the outdoor-side heat insulating layer, the thickness Tb of the indoor-side heat insulating layer, and the thickness Ths of the heat storage layer were changed to those of the layer configuration 1 as shown on Table 3. Results of the simulation are shown on Table 17, Table 21, Table 25, and Table 29.

Comparative Example 20

Simulation was carried out in a similar manner as in Comparative Example 16, except that the thickness Ta of the outdoor-side heat insulating layer, the thickness Tb of the indoor-side heat insulating layer, and the thickness Ths of the heat storage layer were changed to those of the layer configuration 1 as shown on Table 3. Results of the simulation are shown on Table 17, Table 21, Table 25, and Table 29.

Comparative Example 21

Simulation was carried out in a similar manner as in Comparative Example 13, except that the thickness Ta of the outdoor-side heat insulating layer, the thickness Tb of the indoor-side heat insulating layer, and the thickness Ths of the heat storage layer were changed to those of the layer configuration 4 as shown on Table 3. Results of the simulation are shown on Table 20, Table 24, Table 28, and Table 29.

Comparative Example 22

Simulation was carried out in a similar manner as in Comparative Example 14, except that the thickness Ta of the outdoor-side heat insulating layer, the thickness Tb of the indoor-side heat insulating layer, and the thickness Ths of the heat storage layer were changed to those of the layer configuration 4 as shown on Table 3. Results of the simulation are shown on Table 20, Table 24, Table 28, and Table 29.

Comparative Example 23

Simulation was carried out in a similar manner as in Comparative Example 15, except that the thickness Ta of the outdoor-side heat insulating layer, the thickness Tb of the indoor-side heat insulating layer, and the thickness Ths of the heat storage layer were changed to those of the layer configuration 4 as shown on Table 3. Results of the simulation are shown on Table 20, Table 24, Table 28, and Table 29.

Comparative Example 24

Simulation was carried out in a similar manner as in Comparative Example 16, except that the thickness Ta of the outdoor-side heat insulating layer, the thickness Tb of the indoor-side heat insulating layer, and the thickness Ths of the heat storage layer were changed to those of the layer configuration 4 as shown on Table 3. Results of the simulation are shown on Table 20, Table 24, Table 28, and Table 29.

Note that the layer configurations and heat storage materials employed in Examples and Comparative Examples are shown on Table 30.

TABLE 2

| Material | Density [$kg/m^3$] | Sensible heat [$J/(kg \cdot K)$] | Thermal conductivity [$W/(\cdot K)$] |
| --- | --- | --- | --- |
| Heat storage layer (C1) | 1000 | 1950 | 0.190 |
| Outdoor-side heat insulating layer (A1) | 30.0 | 1200 | 0.030 (Ka) |
| Indoor-side heat insulating layer (B1) | 30.0 | 1200 | 0.030 (Kb) |

TABLE 3

| | | Layer configuration 1 (Comparative Examples 1 to 4, 17 to 20) | Layer configuration 2 (Examples 1 to 4, Comparative Examples 9 to 12) | Layer configuration 3 (Examples 5 to 8, Comparative Examples 13 to 16) | Layer configuration 4 (Comparative Examples 5 to 8, 21 to 24) |
| --- | --- | --- | --- | --- | --- |
| Thickness [mm] | Outdoor-side heat insulating layer (Ta) | 180 | 120 | 80.0 | 20.0 |
| | Heat storage layer (Ths) | 5.0 | 5.0 | 5.0 | 5.0 |
| | Indoor-side heat insulating layer (Tb) | 20.0 | 80.0 | 120 | 180 |
| R1 [—] | | 0.10 | 0.40 | 0.60 | 0.90 |

TABLE 4

| | | Influent heat amount of layer configuration 1 [$Wh/m^2/Day$] | | | |
| --- | --- | --- | --- | --- | --- |
| Indoor temperature | Month & date | Comparative Example 1 (heat storage material 1) | Comparative Example 2 (heat storage material 2) | Comparative Example 3 (heat storage material 3) | Comparative Example 4 (heat storage material 4) |
| 28° C. | July 21st | 41.1 | 39.6 | 39.6 | 40.3 |
| | August 21st | 24.1 | 21.9 | 21.9 | 22.6 |
| | September 10th | 23.1 | 20.0 | 20.0 | 21.1 |
| 26° C. | July 21st | 47.3 | 46.4 | 46.4 | 46.5 |
| | August 21st | 29.1 | 27.7 | 27.7 | 27.7 |
| | September 10th | 28.0 | 25.5 | 25.5 | 25.5 |
| 24° C. | July 21st | 53.5 | 53.4 | 53.4 | 53.5 |
| | August 21st | 34.1 | 33.8 | 33.8 | 33.5 |
| | September 10th | 32.0 | 31.2 | 31.2 | 30.3 |

TABLE 5

| Indoor temperature | Month & date | Influent heat amount of layer configuration 2 [Wh/m$^2$/Day] | | | |
|---|---|---|---|---|---|
| | | Example 1 (heat storage material 1) | Example 2 (heat storage material 2) | Example 3 (heat storage material 3) | Example 4 (heat storage material 4) |
| 28° C. | July 21st | 34.2 | 34.5 | 34.5 | 36.9 |
| | August 21st | 18.0 | 16.7 | 16.7 | 17.9 |
| | September 10th | 15.0 | 12.9 | 12.9 | 14.4 |
| 26° C. | July 21st | 44.0 | 43.0 | 43.0 | 44.6 |
| | August 21st | 25.7 | 24.6 | 24.6 | 25.0 |
| | September 10th | 21.8 | 19.5 | 19.5 | 20.0 |
| 24° C. | July 21st | 52.4 | 51.4 | 51.4 | 52.2 |
| | August 21st | 32.7 | 32.5 | 32.5 | 32.6 |
| | September 10th | 28.0 | 26.6 | 26.6 | 26.5 |

TABLE 6

| Indoor temperature | Month & date | Influent heat amount of layer configuration 3 [Wh/m$^2$/Day] | | | |
|---|---|---|---|---|---|
| | | Example 5 (heat storage material 1) | Example 6 (heat storage material 2) | Example 7 (heat storage material 3) | Example 8 (heat storage material 4) |
| 28° C. | July 21st | 33.2 | 35.0 | 35.0 | 37.2 |
| | August 21st | 17.3 | 16.7 | 16.7 | 18.0 |
| | September 10th | 14.0 | 12.9 | 12.9 | 14.4 |
| 26° C. | July 21st | 41.5 | 42.6 | 42.6 | 44.6 |
| | August 21st | 25.0 | 24.3 | 24.3 | 25.0 |
| | September 10th | 20.5 | 19.1 | 19.1 | 19.9 |
| 24° C. | July 21st | 49.9 | 50.3 | 50.3 | 52.0 |
| | August 21st | 32.5 | 32.0 | 32.0 | 32.4 |
| | September 10th | 27.0 | 26.1 | 26.1 | 26.3 |

TABLE 7

| Indoor temperature | Month & date | Influent heat amount of layer configuration 4 [Wh/m$^2$/Day] | | | |
|---|---|---|---|---|---|
| | | Comparative Example 5 (heat storage material 1) | Comparative Example 6 (heat storage material 2) | Comparative Example 7 (heat storage material 3) | Comparative Example 8 (heat storage material 4) |
| 28° C. | July 21st | 39.6 | 39.8 | 39.8 | 40.4 |
| | August 21st | 18.0 | 16.7 | 16.7 | 17.9 |
| | September 10th | 20.7 | 20.7 | 20.7 | 21.3 |
| 26° C. | July 21st | 46.3 | 46.3 | 46.3 | 46.5 |
| | August 21st | 27.4 | 27.2 | 27.2 | 27.6 |
| | September 10th | 25.3 | 25.2 | 25.2 | 25.5 |
| 24° C. | July 21st | 53.5 | 53.5 | 53.5 | 53.5 |
| | August 21st | 33.5 | 33.3 | 33.3 | 33.4 |
| | September 10th | 30.3 | 30.1 | 30.1 | 30.1 |

TABLE 8

| | | Influent heat amount reduction ratio of layer configuration 1 [%] | | | |
|---|---|---|---|---|---|
| Indoor temperature | Month & date | Comparative Example 1 (heat storage material 1) | Comparative Example 2 (heat storage material 2) | Comparative Example 3 (heat storage material 3) | Comparative Example 4 (heat storage material 4) |
| 28° C. | July 21st | 2.4 | 5.9 | 5.9 | 4.3 |
| | August 21st | 2.4 | 11.3 | 11.3 | 8.5 |
| | September 10th | 5.3 | 18.0 | 18.0 | 13.5 |
| 26° C. | July 21st | 0.0 | 1.9 | 1.9 | 1.7 |
| | August 21st | 0.0 | 4.8 | 4.8 | 4.8 |
| | September 10th | 0.0 | 8.9 | 8.9 | 8.9 |
| 24° C. | July 21st | 0.0 | 0.2 | 0.2 | 0.0 |
| | August 21st | 0.0 | 0.9 | 0.9 | 1.8 |
| | September 10th | 0.0 | 2.5 | 2.5 | 5.3 |

TABLE 9

| | | Influent heat amount reduction ratio of layer configuration 2 [%] | | | |
|---|---|---|---|---|---|
| Indoor temperature | Month & date | Example 1 (heat storage material 1) | Example 2 (heat storage material 2) | Example 3 (heat storage material 3) | Example 4 (heat storage material 4) |
| 28° C. | July 21st | 13.2 | 12.4 | 12.4 | 6.3 |
| | August 21st | 16.3 | 22.3 | 22.3 | 16.7 |
| | September 10th | 22.3 | 33.2 | 33.2 | 25.4 |
| 26° C. | July 21st | 4.8 | 6.9 | 6.9 | 3.5 |
| | August 21st | 4.1 | 8.2 | 8.2 | 6.7 |
| | September 10th | 7.6 | 17.4 | 17.4 | 15.3 |
| 24° C. | July 21st | 1.9 | 3.7 | 3.7 | 2.2 |
| | August 21st | 1.2 | 1.8 | 1.8 | 1.5 |
| | September 10th | 2.1 | 7.0 | 7.0 | 7.3 |

TABLE 10

| | | Influent heat amount reduction ratio of layer configuration 3 [%] | | | |
|---|---|---|---|---|---|
| Indoor temperature | Month & date | Example 5 (heat storage material 1) | Example 6 (heat storage material 2) | Example 7 (heat storage material 3) | Example 8 (heat storage material 4) |
| 28° C. | July 21st | 15.7 | 11.2 | 11.2 | 5.6 |
| | August 21st | 19.5 | 22.3 | 22.3 | 16.3 |
| | September 10th | 27.5 | 33.2 | 33.2 | 25.4 |
| 26° C. | July 21st | 10.2 | 7.8 | 7.8 | 3.5 |
| | August 21st | 6.7 | 9.3 | 9.3 | 6.7 |
| | September 10th | 13.1 | 19.1 | 19.1 | 15.7 |
| 24° C. | July 21st | 6.6 | 5.8 | 5.8 | 2.6 |
| | August 21st | 1.5 | 3.0 | 3.0 | 1.8 |
| | September 10th | 5.6 | 8.7 | 8.7 | 8.0 |

TABLE 11

| | | Influent heat amount reduction ratio of layer configuration 4 [%] | | | |
|---|---|---|---|---|---|
| Indoor temperature | Month & date | Comparative Example 5 (heat storage material 1) | Comparative Example 6 (heat storage material 2) | Comparative Example 7 (heat storage material 3) | Comparative Example 8 (heat storage material 4) |
| 28° C. | July 21st | 5.9 | 5.5 | 5.5 | 4.0 |
| | August 21st | 16.3 | 22.3 | 22.3 | 16.7 |
| | September 10th | 15.2 | 15.2 | 15.2 | 12.7 |
| 26° C. | July 21st | 2.1 | 2.1 | 2.1 | 1.7 |
| | August 21st | 5.8 | 6.5 | 6.5 | 5.2 |
| | September 10th | 9.6 | 10.0 | 10.0 | 8.9 |
| 24° C. | July 21st | 0.0 | 0.0 | 0.0 | 0.0 |
| | August 21st | 1.8 | 2.3 | 2.3 | 2.1 |
| | September 10th | 5.3 | 5.9 | 5.9 | 5.9 |

TABLE 12

| | | Influent heat amount reduction point of layer configuration 1 [—] | | | |
|---|---|---|---|---|---|
| Indoor temperature | Month & date | Comparative Example 1 (heat storage material 1) | Comparative Example 2 (heat storage material 2) | Comparative Example 3 (heat storage material 3) | Comparative Example 4 (heat storage material 4) |
| 28° C. | July 21st | 1 | 2 | 2 | 1 |
| | August 21st | 1 | 3 | 3 | 2 |
| | September 10th | 2 | 3 | 3 | 3 |
| 26° C. | July 21st | 0 | 1 | 1 | 1 |
| | August 21st | 0 | 1 | 1 | 1 |
| | September 10th | 0 | 2 | 2 | 2 |
| 24° C. | July 21st | 0 | 0 | 0 | 0 |
| | August 21st | 0 | 0 | 0 | 1 |
| | September 10th | 0 | 1 | 1 | 2 |

TABLE 13

| | | Influent heat amount reduction point of layer configuration 2 [—] | | | |
|---|---|---|---|---|---|
| Indoor temperature | Month & date | Example 1 (heat storage material 1) | Example 2 (heat storage material 2) | Example 3 (heat storage material 3) | Example 4 (heat storage material 4) |
| 28° C. | July 21st | 3 | 3 | 3 | 2 |
| | August 21st | 3 | 4 | 4 | 3 |
| | September 10th | 4 | 4 | 4 | 4 |
| 26° C. | July 21st | 1 | 2 | 2 | 1 |
| | August 21st | 1 | 2 | 2 | 2 |
| | September 10th | 2 | 3 | 3 | 3 |
| 24° C. | July 21st | 1 | 1 | 1 | 1 |
| | August 21st | 1 | 1 | 1 | 1 |
| | September 10th | 1 | 2 | 2 | 2 |

TABLE 14

Influent heat amount reduction point of layer configuration 3 [—]

| Indoor temperature | Month & date | Example 5 (heat storage material 1) | Example 6 (heat storage material 2) | Example 7 (heat storage material 3) | Example 8 (heat storage material 4) |
|---|---|---|---|---|---|
| 28° C. | July 21st | 3 | 3 | 3 | 2 |
|  | August 21st | 3 | 4 | 4 | 3 |
|  | September 10th | 4 | 4 | 4 | 4 |
| 26° C. | July 21st | 3 | 2 | 2 | 1 |
|  | August 21st | 2 | 2 | 2 | 2 |
|  | September 10th | 3 | 3 | 3 | 3 |
| 24° C. | July 21st | 2 | 2 | 2 | 1 |
|  | August 21st | 1 | 1 | 1 | 1 |
|  | September 10th | 2 | 2 | 2 | 2 |

TABLE 15

Influent heat amount reduction point of layer configuration 4 [—]

| Indoor temperature | Month & date | Comparative Example 5 (heat storage material 1) | Comparative Example 6 (heat storage material 2) | Comparative Example 7 (heat storage material 3) | Comparative Example 8 (heat storage material 4) |
|---|---|---|---|---|---|
| 28° C. | July 21st | 2 | 2 | 2 | 1 |
|  | August 21st | 3 | 4 | 4 | 3 |
|  | September 10th | 3 | 3 | 3 | 3 |
| 26° C. | July 21st | 1 | 1 | 1 | 1 |
|  | August 21st | 2 | 2 | 2 | 2 |
|  | September 10th | 2 | 3 | 3 | 2 |
| 24° C. | July 21st | 0 | 0 | 0 | 0 |
|  | August 21st | 1 | 1 | 1 | 1 |
|  | September 10th | 2 | 2 | 2 | 2 |

TABLE 16

Overall property Sum of arithmetic mean and geometric mean of the influent heat amount reduction point [—]

| Latent heat property of heat storage layer | | Heat storage material 1 | Heat storage material 2 | Heat storage material 3 | Heat storage material 4 |
|---|---|---|---|---|---|
| R2 | | 1.0 | 1.0 | 0.10 | 0.97 |
| R3 | | 0.75 | 0.44 | 0.34 | 0.31 |
| Thickness configuration of lamination (R1) | Layer configuration 1 (0.1) | Comparative Example 1 0.4 | Comparative Example 2 1.4 | Comparative Example 3 1.4 | Comparative Example 4 1.4 |
|  | Layer configuration 2 (0.4) | Example 1 3.5 | Example 2 4.6 | Example 3 4.6 | Example 4 4.0 |
|  | Layer configuration 3 (0.6) | Example 5 5.0 | Example 6 4.9 | Example 7 4.9 | Example 8 4.0 |
|  | Layer configuration 4 (0.9) | Comparative Example 5 1.8 | Comparative Example 6 2.0 | Comparative Example 7 2.0 | Comparative Example 8 1.7 |

TABLE 17

| | | Influent heat amount of layer configuration 1 [Wh/m²/Day] | | | |
|---|---|---|---|---|---|
| Indoor temperature | Month & date | Comparative Example 17 (heat storage material 5) | Comparative Example 18 (heat storage material 6) | Comparative Example 19 (heat storage material 7) | Comparative Example 20 (heat storage material 8) |
| 28° C. | July 21st | 42.1 | 42.0 | 42.1 | 40.7 |
| | August 21st | 24.7 | 24.7 | 24.7 | 23.2 |
| | September 10th | 24.4 | 24.4 | 24.4 | 21.9 |
| 26° C. | July 21st | 47.3 | 47.3 | 47.3 | 46.6 |
| | August 21st | 29.1 | 29.1 | 29.1 | 28.0 |
| | September 10th | 28.0 | 28.0 | 28.0 | 26.0 |
| 24° C. | July 21st | 53.5 | 53.5 | 53.5 | 53.4 |
| | August 21st | 34.1 | 34.1 | 34.1 | 33.6 |
| | September 10th | 32.0 | 32.0 | 32.0 | 30.6 |

TABLE 18

| | | Influent heat amount of layer configuration 2 [Wh/m²/Day] | | | |
|---|---|---|---|---|---|
| Indoor temperature | Month & date | Comparative Example 9 (heat storage material 5) | Comparative Example 10 (heat storage material 6) | Comparative Example 11 (heat storage material 7) | Comparative Example 12 (heat storage material 8) |
| 28° C. | July 21st | 39.4 | 35.8 | 39.4 | 37.8 |
| | August 21st | 21.5 | 19.7 | 21.5 | 18.8 |
| | September 10th | 19.3 | 17.0 | 19.3 | 15.4 |
| 26° C. | July 21st | 46.2 | 44.8 | 46.2 | 45.3 |
| | August 21st | 26.8 | 26.4 | 26.8 | 25.4 |
| | September 10th | 23.6 | 22.8 | 23.6 | 20.7 |
| 24° C. | July 21st | 53.4 | 52.8 | 53.4 | 52.7 |
| | August 21st | 33.1 | 33.0 | 33.1 | 32.8 |
| | September 10th | 28.6 | 28.4 | 28.6 | 26.8 |

TABLE 19

| | | Influent heat amount of layer configuration 3 [Wh/m²/Day] | | | |
|---|---|---|---|---|---|
| Indoor temperature | Month & date | Comparative Example 13 (heat storage material 5) | Comparative Example 14 (heat storage material 6) | Comparative Example 15 (heat storage material 7) | Comparative Example 16 (heat storage material 8) |
| 28° C. | July 21st | 39.4 | 32.2 | 39.4 | 38.0 |
| | August 21st | 21.5 | 18.2 | 21.5 | 18.9 |
| | September 10th | 19.3 | 15.2 | 19.3 | 15.5 |
| 26° C. | July 21st | 46.2 | 41.2 | 46.2 | 45.3 |
| | August 21st | 26.8 | 25.3 | 26.8 | 25.4 |
| | September 10th | 23.6 | 21.3 | 23.6 | 20.6 |
| 24° C. | July 21st | 53.4 | 50.3 | 53.4 | 52.6 |
| | August 21st | 33.0 | 32.7 | 33.0 | 32.7 |
| | September 10th | 28.6 | 27.5 | 28.6 | 26.7 |

TABLE 20

| | | Influent heat amount of layer configuration 4 [Wh/m²/Day] | | | |
|---|---|---|---|---|---|
| Indoor temperature | Month & date | Comparative Example 21 (heat storage material 5) | Comparative Example 22 (heat storage material 6) | Comparative Example 23 (heat storage material 7) | Comparative Example 24 (heat storage material 8) |
| 28° C. | July 21st | 42.1 | 39.6 | 41.9 | 40.8 |
| | August 21st | 21.5 | 19.7 | 21.5 | 18.8 |
| | September 10th | 24.4 | 20.6 | 24.4 | 22.1 |
| 26° C. | July 21st | 47.3 | 46.3 | 47.1 | 46.6 |
| | August 21st | 29.1 | 27.4 | 29.1 | 28.0 |
| | September 10th | 28.0 | 25.3 | 28.0 | 26.1 |
| 24° C. | July 21st | 53.5 | 53.5 | 53.5 | 53.5 |
| | August 21st | 34.1 | 33.5 | 34.1 | 33.6 |
| | September 10th | 32.0 | 30.3 | 31.6 | 30.5 |

TABLE 21

| | | Influent heat amount reduction ratio of layer configuration 1 [%] | | | |
|---|---|---|---|---|---|
| Indoor temperature | Month & date | Comparative Example 17 (heat storage material 5) | Comparative Example 18 (heat storage material 6) | Comparative Example 19 (heat storage material 7) | Comparative Example 20 (heat storage material 8) |
| 28° C. | July 21st | 0.0 | 0.2 | 0.0 | 3.3 |
| | August 21st | 0.0 | 0.0 | 0.0 | 6.1 |
| | September 10th | 0.0 | 0.0 | 0.0 | 10.2 |
| 26° C. | July 21st | 0.0 | 0.0 | 0.0 | 1.5 |
| | August 21st | 0.0 | 0.0 | 0.0 | 3.8 |
| | September 10th | 0.0 | 0.0 | 0.0 | 7.1 |
| 24° C. | July 21st | 0.0 | 0.0 | 0.0 | 0.2 |
| | August 21st | 0.0 | 0.0 | 0.0 | 1.5 |
| | September 10th | 0.0 | 0.0 | 0.0 | 4.4 |

TABLE 22

| | | Influent heat amount reduction ratio of layer configuration 2 [%] | | | |
|---|---|---|---|---|---|
| Indoor temperature | Month & date | Comparative Example 9 (heat storage material 5) | Comparative Example 10 (heat storage material 6) | Comparative Example 11 (heat storage material 7) | Comparative Example 12 (heat storage material 8) |
| 28° C. | July 21st | 0.0 | 9.1 | 0.0 | 4.1 |
| | August 21st | 0.0 | 8.4 | 0.0 | 12.6 |
| | September 10th | 0.0 | 11.9 | 0.0 | 20.2 |
| 26° C. | July 21st | 0.0 | 3.0 | 0.0 | 1.9 |
| | August 21st | 0.0 | 1.5 | 0.0 | 5.2 |
| | September 10th | 0.0 | 3.4 | 0.0 | 12.3 |
| 24° C. | July 21st | 0.0 | 1.1 | 0.0 | 1.3 |
| | August 21st | 0.0 | 0.3 | 0.0 | 0.9 |
| | September 10th | 0.0 | 0.7 | 0.0 | 6.3 |

TABLE 23

| | | Influent heat amount reduction ratio of layer configuration 3 [%] | | | |
|---|---|---|---|---|---|
| Indoor temperature | Month & date | Comparative Example 13 (heat storage material 5) | Comparative Example 14 (heat storage material 6) | Comparative Example 15 (heat storage material 7) | Comparative Example 16 (heat storage material 8) |
| 28° C. | July 21st | 0.0 | 18.3 | 0.0 | 3.6 |
| | August 21st | 0.0 | 15.3 | 0.0 | 12.1 |
| | September 10th | 0.0 | 21.2 | 0.0 | 19.7 |
| 26° C. | July 21st | 0.0 | 10.8 | 0.0 | 1.9 |
| | August 21st | 0.0 | 5.6 | 0.0 | 5.2 |
| | September 10th | 0.0 | 9.7 | 0.0 | 12.7 |
| 24° C. | July 21st | 0.0 | 5.8 | 0.0 | 1.5 |
| | August 21st | 0.0 | 0.9 | 0.0 | 0.9 |
| | September 10th | 0.0 | 3.8 | 0.0 | 6.6 |

TABLE 24

| | | Influent heat amount reduction ratio of layer configuration 4 [%] | | | |
|---|---|---|---|---|---|
| Indoor temperature | Month & date | Comparative Example 21 (heat storage material 5) | Comparative Example 22 (heat storage material 6) | Comparative Example 23 (heat storage material 7) | Comparative Example 24 (heat storage material 8) |
| 28° C. | July 21st | 0.0 | 5.9 | 0.5 | 3.1 |
| | August 21st | 0.0 | 8.4 | 0.0 | 12.6 |
| | September 10th | 0.0 | 15.6 | 0.0 | 9.4 |
| 26° C. | July 21st | 0.0 | 2.1 | 0.4 | 1.5 |
| | August 21st | 0.0 | 5.8 | 0.0 | 3.8 |
| | September 10th | 0.0 | 9.6 | 0.0 | 6.8 |
| 24° C. | July 21st | 0.0 | 0.0 | 0.0 | 0.0 |
| | August 21st | 0.0 | 1.8 | 0.0 | 1.5 |
| | September 10th | 0.0 | 5.3 | 1.3 | 4.7 |

TABLE 25

| | | Influent heat amount reduction point of layer configuration 1 [—] | | | |
|---|---|---|---|---|---|
| Indoor temperature | Month & date | Comparative Example 17 (heat storage material 5) | Comparative Example 18 (heat storage material 6) | Comparative Example 19 (heat storage material 7) | Comparative Example 20 (heat storage material 8) |
| 28° C. | July 21st | 0 | 0 | 0 | 1 |
| | August 21st | 0 | 0 | 0 | 2 |
| | September 10th | 0 | 0 | 0 | 3 |
| 26° C. | July 21st | 0 | 0 | 0 | 1 |
| | August 21st | 0 | 0 | 0 | 1 |
| | September 10th | 0 | 0 | 0 | 2 |
| 24° C. | July 21st | 0 | 0 | 0 | 0 |
| | August 21st | 0 | 0 | 0 | 1 |
| | September 10th | 0 | 0 | 0 | 1 |

TABLE 26

| Indoor temperature | Month & date | Influent heat amount reduction point of layer configuration 2 [—] | | | |
|---|---|---|---|---|---|
| | | Comparative Example 9 (heat storage material 5) | Comparative Example 10 (heat storage material 6) | Comparative Example 11 (heat storage material 7) | Comparative Example 12 (heat storage material 8) |
| 28° C. | July 21st | 0 | 2 | 0 | 1 |
| | August 21st | 0 | 2 | 0 | 3 |
| | September 10th | 0 | 3 | 0 | 4 |
| 26° C. | July 21st | 0 | 1 | 0 | 1 |
| | August 21st | 0 | 1 | 0 | 2 |
| | September 10th | 0 | 1 | 0 | 3 |
| 24° C. | July 21st | 0 | 1 | 0 | 1 |
| | August 21st | 0 | 0 | 0 | 0 |
| | September 10th | 0 | 0 | 0 | 2 |

TABLE 27

| Indoor temperature | Month & date | Influent heat amount reduction point of layer configuration 3 [—] | | | |
|---|---|---|---|---|---|
| | | Comparative Example 13 (heat storage material 5) | Comparative Example 14 (heat storage material 6) | Comparative Example 15 (heat storage material 7) | Comparative Example 16 (heat storage material 8) |
| 28° C. | July 21st | 0 | 3 | 0 | 1 |
| | August 21st | 0 | 3 | 0 | 3 |
| | September 10th | 0 | 4 | 0 | 3 |
| 26° C. | July 21st | 0 | 3 | 0 | 1 |
| | August 21st | 0 | 2 | 0 | 2 |
| | September 10th | 0 | 2 | 0 | 3 |
| 24° C. | July 21st | 0 | 2 | 0 | 1 |
| | August 21st | 0 | 0 | 0 | 0 |
| | September 10th | 0 | 1 | 0 | 2 |

TABLE 28

| Indoor temperature | Month & date | Influent heat amount reduction point of layer configuration 4 [—] | | | |
|---|---|---|---|---|---|
| | | Comparative Example 21 (heat storage material 5) | Comparative Example 22 (heat storage material 6) | Comparative Example 23 (heat storage material 7) | Comparative Example 24 (heat storage material 8) |
| 28° C. | July 21st | 0 | 2 | 0 | 1 |
| | August 21st | 0 | 2 | 0 | 3 |
| | September 10th | 0 | 3 | 0 | 2 |
| 26° C. | July 21st | 0 | 1 | 0 | 1 |
| | August 21st | 0 | 2 | 0 | 1 |
| | September 10th | 0 | 2 | 0 | 2 |
| 24° C. | July 21st | 0 | 0 | 0 | 0 |
| | August 21st | 0 | 1 | 0 | 1 |
| | September 10th | 0 | 2 | 1 | 1 |

TABLE 29

| | | Sum of arithmetic mean and geometric mean of the influent heat amount reduction point [—] | | | |
|---|---|---|---|---|---|
| Latent heat property of heat storage layer | | Heat storage material 5 | Heat storage material 6 | Heat storage material 7 | Heat storage material 8 |
| R2 | | 0.0 | 1.0 | 0.0 | 0.82 |
| R3 | | 1.0 | 1.0 | 1.0 | 0.29 |
| Thickness configuration of lamination (R1) | Layer configuration 1 (0.1) | Comparative Example 17 0.0 | Comparative Example 18 0.0 | Comparative Example 19 0.0 | Comparative Example 20 1.3 |
| | Layer configuration 2 (0.4) | Comparative Example 9 0.0 | Comparative Example 10 1.2 | Comparative Example 11 0.0 | Comparative Example 12 1.9 |
| | Layer configuration 3 (0.6) | Comparative Example 13 0.0 | Comparative Example 14 2.2 | Comparative Example 15 0.0 | Comparative Example 16 1.8 |
| | Layer configuration 4 (0.9) | Comparative Example 21 0.0 | Comparative Example 22 1.7 | Comparative Example 23 0.1 | Comparative Example 24 1.3 |

TABLE 30

| Heat storage material | | | Layer configuration 1 R1 = 0.10 | Layer configuration 2 R1 = 0.40 | Layer configuration 3 R1 = 0.60 | Layer configuration 4 R1 = 0.90 |
|---|---|---|---|---|---|---|
| Heat storage material 1 | R2 = 1.0 | R3 = 0.75 | Comparative Example 1 | Example 1 | Example 5 | Comparative Example 5 |
| Heat storage material 2 | R2 = 1.0 | R3 = 0.44 | Comparative Example 2 | Example 2 | Example 6 | Comparative Example 6 |
| Heat storage material 3 | R2 = 0.94 | R3 = 0.34 | Comparative Example 3 | Example 3 | Example 7 | Comparative Example 7 |
| Heat storage material 4 | R2 = 0.84 | R3 = 0.31 | Comparative Example 4 | Example 4 | Example 8 | Comparative Example 8 |
| Heat storage material 5 | R2 = 0.0 | R3 = 1.0 | Comparative Example 17 | Comparative Example 9 | Comparative Example 13 | Comparative Example 21 |
| Heat storage material 6 | R2 = 1.0 | R3 = 1.0 | Comparative Example 18 | Comparative Example 10 | Comparative Example 14 | Comparative Example 22 |
| Heat storage material 7 | R2 = 0.0 | R3 = 1.0 | Comparative Example 19 | Comparative Example 11 | Comparative Example 15 | Comparative Example 23 |
| Heat storage material 8 | R2 = 0.65 | R3 = 0.29 | Comparative Example 20 | Comparative Example 12 | Comparative Example 16 | Comparative Example 24 |

TABLE 31

| | Example 1 | Example 2 | Example 3 | Example 4 |
|---|---|---|---|---|
| R1 [—] | 0.40 | 0.40 | 0.40 | 0.40 |
| R2 [—] | 1.0 | 1.0 | 1.0 | 0.97 |
| R3 [—] | 0.75 | 0.44 | 0.34 | 0.31 |
| X' [° C.] | 33 | 33 | 33 | 33 |
| L5 [kJ/kg] | 45 | 26 | 18 | 14 |
| L20 [kJ/kg] | 60 | 60 | 53 | 45 |
| R [—] | 0.060 | 0.032 | 0.064 | 0.079 |

TABLE 32

| | Example 5 | Example 6 | Example 7 | Example 8 |
|---|---|---|---|---|
| R1 [—] | 0.60 | 0.60 | 0.60 | 0.60 |
| R2 [—] | 1.0 | 1.0 | 1.0 | 0.97 |
| R3 [—] | 0.75 | 0.44 | 0.34 | 0.31 |
| X' [° C.] | 33 | 33 | 33 | 33 |
| L5 [kJ/kg] | 45 | 26 | 18 | 14 |
| L20 [kJ/kg] | 60 | 60 | 53 | 45 |
| R [—] | 0.060 | 0.032 | 0.064 | 0.079 |

TABLE 33

| | Comparative Example 1 | Comparative Example 2 | Comparative Example 3 | Comparative Example 4 |
|---|---|---|---|---|
| R1 [—] | 0.10 | 0.10 | 0.10 | 0.10 |
| R2 [—] | 1.0 | 1.0 | 1.0 | 0.97 |
| R3 [—] | 0.75 | 0.44 | 0.34 | 0.31 |
| X' [° C.] | 33 | 33 | 33 | 33 |
| L5 [kJ/kg] | 45 | 26 | 18 | 14 |
| L20 [kJ/kg] | 60 | 60 | 53 | 45 |
| R [—] | 0.360 | 0.332 | 0.364 | 0.379 |

TABLE 34

| | Comparative Example 5 | Comparative Example 6 | Comparative Example 7 | Comparative Example 8 |
|---|---|---|---|---|
| R1 [—] | 0.90 | 0.90 | 0.90 | 0.90 |
| R2 [—] | 1.0 | 1.0 | 0.94 | 0.84 |
| R3 [—] | 0.75 | 0.44 | 0.34 | 0.31 |
| X' [° C.] | 33 | 33 | 33 | 33 |
| L5 [kJ/kg] | 45 | 26 | 18 | 14 |
| L20 [kJ/kg] | 60 | 60 | 53 | 45 |
| R [—] | 0.360 | 0.332 | 0.364 | 0.379 |

TABLE 35

| | Comparative Example 9 | Comparative Example 10 | Comparative Example 11 | Comparative Example 12 |
|---|---|---|---|---|
| R1 [—] | 0.40 | 0.40 | 0.40 | 0.40 |
| R2 [—] | 0.0 | 1.0 | 0.0 | 0.82 |
| R3 [—] | 1.0 | 1.0 | 1.0 | 0.29 |
| X' [° C.] | 10 | 33 | 55 | 33 |
| L5 [kJ/kg] | 60 | 60 | 60 | 10 |
| L20 [kJ/kg] | 60 | 60 | 60 | 33 |
| R [—] | 1.223 | 0.223 | 1.223 | 0.120 |

TABLE 36

| | Comparative Example 13 | Comparative Example 14 | Comparative Example 15 | Comparative Example 16 |
|---|---|---|---|---|
| R1 [—] | 0.60 | 0.60 | 0.60 | 0.60 |
| R2 [—] | 0.0 | 1.0 | 0.0 | 0.82 |
| R3 [—] | 1.0 | 1.0 | 1.0 | 0.29 |
| X' [° C.] | 10 | 33 | 55 | 33 |
| L5 [kJ/kg] | 60 | 60 | 60 | 10 |
| L20 [kJ/kg] | 60 | 60 | 60 | 33 |
| R [—] | 1.223 | 0.223 | 1.223 | 0.120 |

TABLE 37

| | Comparative Example 17 | Comparative Example 18 | Comparative Example 19 | Comparative Example 20 |
|---|---|---|---|---|
| R1 [—] | 0.10 | 0.10 | 0.10 | 0.10 |
| R2 [—] | 0.0 | 1.0 | 0.0 | 0.82 |
| R3 [—] | 1.0 | 1.0 | 1.0 | 0.29 |
| X' [° C.] | 10 | 33 | 55 | 33 |
| L5 [kJ/kg] | 60 | 60 | 60 | 10 |
| L20 [kJ/kg] | 60 | 60 | 60 | 33 |
| R [—] | 1.523 | 0.523 | 1.523 | 0.420 |

TABLE 38

| | Comparative Example 21 | Comparative Example 22 | Comparative Example 23 | Comparative Example 24 |
|---|---|---|---|---|
| R1 [—] | 0.90 | 0.90 | 0.90 | 0.90 |
| R2 [—] | 0.0 | 1.0 | 0.0 | 0.82 |
| R3 [—] | 1.0 | 1.0 | 1.0 | 0.29 |
| X' [° C.] | 10 | 33 | 55 | 33 |
| L5 [kJ/kg] | 60 | 60 | 60 | 10 |
| L20 [kJ/kg] | 60 | 60 | 60 | 33 |
| R [—] | 1.523 | 0.523 | 1.523 | 0.420 |

FIG. 8 is a graph on which the results of Examples 1 to 8 and Comparative Examples 1 to 24 are plotted where the horizontal axis indicates parameter R and the vertical axis indicates the sum of the arithmetic mean and geometric mean of the influent heat amount reduction points (overall property). The laminations of Examples 1 to 8 and Comparative Examples 1 to 24 were identical with each other in terms of total thickness. When the laminations of Examples 1 to 8 with parameter R of 0.20 or less are used, it would become possible to facilitate reduction of the influent heat amount into indoor environment, regardless of various outdoor air temperature conditions and indoor setting temperatures.

What is claimed is:

1. A member for roofing or ceiling, comprising:
   an outdoor-side heat insulating layer (A);
   an indoor-side heat insulating layer (B); and
   a heat storage layer between the outdoor-side heat insulating layer (A) and the indoor-side heat insulating layer (B), wherein
   R≤0.10 where R is represented by Equation (3):

$$R=2(R1-0.5)^2+(R2-1)^2+(R3-0.55)^2 \quad (3),$$

where R1 is represented by Equation (1):

$$R1=(Tb/Kb)/(Ta/Ka+Tb/Kb) \quad (1),$$

where Ka is a thermal conductivity of the outdoor-side heat insulating layer (A), Ta is a thickness of the outdoor-side heat insulating layer (A), Kb is a thermal conductivity of the indoor-side heat insulating layer (B), and Tb is a thickness of the indoor-side heat insulating layer (B),
   R2 is a ratio of a latent heat amount of the heat storage layer in a temperature range of 15° C. to 50° C. with respect to a latent heat amount of the heat storage layer in a temperature range of −10° C. to 60° C., and
   R3 is represented by Equation (2):

$$R3=L5/L20 \quad (2),$$

where L5 is a latent heat amount of the heat storage layer in a temperature range X, and L20 is a latent heat amount of the heat storage layer in a temperature range of (X'−10)° C. inclusive to (X'+10)° C. inclusive,
   X is a 5° C.-width temperature range in which the latent heat amount of the heat storage layer is the largest among latent heat amounts of given 5° C.-width temperature ranges within the temperature range of −10° C. to 60° C., and
   X' is a center temperature of the temperature range X.

2. The member for roofing or ceiling according to claim 1, wherein R1 is not less than 0.30 but not more than 0.70, R2 is not less than 0.85 but not more than 1.00, and R3 is not less than 0.30 but not more than 0.80.

3. The member for roofing or ceiling according to claim 1, wherein at least one layer selected from the group consisting of the outdoor-side heat insulating layer (A) and the indoor-side heat insulating layer (B) is a layer comprising a polystyrene foam, a rigid polyurethane foam or a phenol resin foam having a thermal conductivity of 0.03 W/(mK) or less.

4. The member for roofing or ceiling according to claim 1, wherein X' is not less than 15° C. but not more than 50° C.

5. The member for roofing or ceiling according to claim 1, wherein the heat storage layer has a moisture permeability resistance of 900 m²h·mmHg/g or less.

6. A construction comprising:
   the member for roofing and/or ceiling according to claim 1, wherein the outdoor-side heat insulating layer (A) included in the member for roofing and/or ceiling is disposed on an outdoor side of the construction, and the indoor-side heat insulating layer (B) is disposed on an indoor side of the construction.

7. A roof comprising the member for roofing or ceiling according to claim 1.

8. A ceiling comprising the member for roofing or ceiling according to claim 1.

* * * * *